(12) United States Patent
Kim

(10) Patent No.: US 7,366,188 B2
(45) Date of Patent: Apr. 29, 2008

(54) GATEWAY FOR SUPPORTING COMMUNICATIONS BETWEEN NETWORK DEVICES OF DIFFERENT PRIVATE NETWORKS

(75) Inventor: Jun-hyeong Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 862 days.

(21) Appl. No.: 10/760,553

(22) Filed: Jan. 21, 2004

(65) Prior Publication Data

US 2004/0218611 A1   Nov. 4, 2004

(30) Foreign Application Priority Data

Jan. 21, 2003   (KR)   ............... 10-2003-0004126
Jan. 9, 2004    (KR)   ............... 2004-1570

(51) Int. Cl.
    H04L 12/56   (2006.01)
(52) U.S. Cl. .............. 370/401; 370/409; 709/228; 709/229
(58) Field of Classification Search ............... 370/401, 370/389; 726/15; 709/228, 229
    See application file for complete search history.

(56) References Cited

U.S. PATENT DOCUMENTS

| | | | | |
|---|---|---|---|---|
| 6,079,020 A * | 6/2000 | Liu | ............... | 726/15 |
| 6,128,664 A * | 10/2000 | Yanagidate et al. | ......... | 709/228 |
| 6,226,751 B1 * | 5/2001 | Arrow et al. | ............... | 726/15 |
| 6,496,867 B1 | 12/2002 | Beser et al. | | |
| 6,944,167 B1 * | 9/2005 | McPherson | ............... | 370/401 |
| 7,209,479 B2 * | 4/2007 | Larson | ............... | 370/389 |
| 2002/0035624 A1 | 3/2002 | Kim | | |
| 2002/0061011 A1 | 5/2002 | Wan | | |
| 2002/0083344 A1 | 6/2002 | Vairavan | | |
| 2002/0198840 A1 | 12/2002 | Banka et al. | | |
| 2003/0028650 A1 * | 2/2003 | Chen et al. | ............... | 709/229 |

FOREIGN PATENT DOCUMENTS

| | | |
|---|---|---|
| JP | 2000-228674 A | 8/2000 |
| JP | 2002-335273 A | 11/2002 |
| KR | 2000-0000185 A | 1/2000 |
| WO | WO 01/97485 A2 | 12/2001 |
| WO | WO 02/27503 A1 | 4/2002 |

* cited by examiner

*Primary Examiner*—Chi Pham
*Assistant Examiner*—Albert T. Chou
(74) *Attorney, Agent, or Firm*—Sughrue Mion, PLLC

(57) ABSTRACT

A gateway supports communications between network devices connected to different private networks. When a tunnel setup request message is received from a host connected to a first private network to setup a tunnel to a second private network connected to a public network, a a control unit of the gateway communicates with the gateway of the second private network, negotiates necessary information, and sets up a VPN tunnel utilizing the information. If the private networks have identical network address, or if network address of one private network is included in the network address of the other, a new network address table is created such that the two private networks can use different network addresses in the VPN tunnel. With respect to data packets being transmitted from the host of the first private network, or from the second private network, an address is translated based on the new network address table, and therefore, the translated address is forwarded.

14 Claims, 13 Drawing Sheets

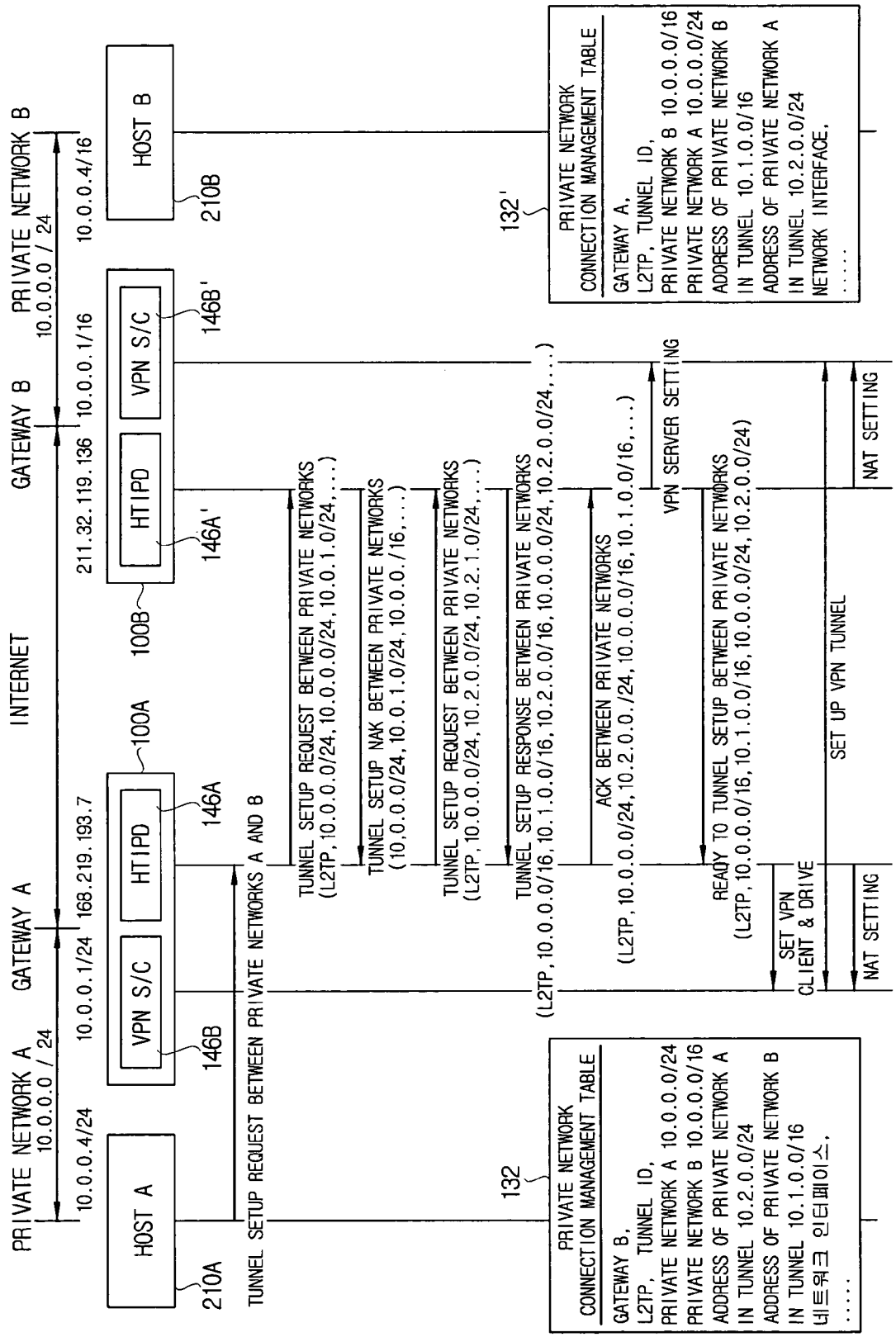

GATEWAY FOR SUPPORTING COMMUNICATIONS BETWEEN NETWORK DEVICES OF DIFFERENT PRIVATE NETWORKS

This application claims is based on and claims priority under 35 U.S.C. § 119 from Korean Patent Application No. 2003-4126, filed on Jan. 21, 2003, and Korean Patent Application No. 2004-1570, filed on Jan. 9, 2004, in the Korean Intellectual Property Office, the entire contents of which are incorporated herein by reference.

BACKGROUND OF THE INVENTION

1. Field of the Invention

The present invention relates to a gateway, and more particularly to a gateway for supporting communications between network devices connected to different networks.

2. Description of the Related Art

With a recent development of communication technology, high-speed data service networks are widespread. Against this backdrop, more and more companies developing and manufacturing digital information home appliances having networking functions, such as refrigerators, digital TVs and set-top boxes which are connectible to the Internet. As these home appliances are enabled to operate as information terminals with network functions added thereto, a new form of network, that is, a home network has been developed.

Electric/electronic products forming a home network at home may be connected to the Internet in a wire or wireless manner, so that a user can transmit and receive information and control electric/electronic products through the Internet, regardless of the user's location, such as homes, remote places and so on.

In order to connect electric/electronic products to the Internet, new types of network devices are provided in homes with necessary programs embedded. Among the network devices, a home gateway operates to connect the home network with the Internet and control the flow of the network packets.

Currently, each home is given one public Internet Protocol (IP) address from an Internet Service Provider (ISP) to connect to the Internet by using a basic home gateway such as an Asymmetrical Digital Subscriber Line (ADSL) and a Cable modem.

These conventional home gateways provide a simple connecting service which connects one home network to the Internet. Meanwhile, a recent trend requires a variety of services to be provided through a home gateway because a plurality of network devices can be used in homes, small office home business (SOHO) and in-house work are widespread, and appliances automation and remote controls are being actively developed. However, the conventional home gateways do not satisfy the current demands.

In order to meet the demands of the customers, a method using private IP addresses has been proposed for a home network. This method applies the network address port translation (NAPT) technology to a home gateway in order for a plurality of network devices of a home network to access the Internet with one shared IP address.

The problem is that an IP address of a home gateway frequently changes, thus requiring a user to find out the current IP address every time the user wants to hook up to the home network connected to the Internet. In order to solve this problem, a technology has been proposed in which a home gateway is given an IP address from an ISP and then a domain name of the home gateway and the assigned IP address are registered in a dynamic Domain Name Server (DNS) server on the Internet. According to this, the user can get access to appliances at his or her home through the domain name rather than the IP address.

A home gateway is given one IP address from an ISP, but, since a plurality of information devices are used at home in a home network environment, there exists a problem that the devices can not be simultaneously connected to the Internet with the shared IP address. Accordingly, private IP addresses are used at home, and the NAPT technology is used that connects information devices to the Internet by using one shared IP address.

If there are packets outgoing to the Internet from a home, the NAPT translates a private IP address of packet source and a source port number into an assigned IP address and a different port number which are recorded in an NAPT translation table. If response packets to the above are forwarded to a home network from the Internet, the home gateway refers to the NAPT table, translates an IP address of packet destination and a destination port number into a private IP address and a port number, and forwards the response packets to the final destination. Packets are abandoned if the packets forwarded to a home network from the Internet are not recorded in the NAPT table.

The use of the NAPT technology enables access to the Internet from a home network. That is, a plurality of network devices on a private network can get access to the Internet by sharing one IP address. However, it is impossible for the network devices to get access to a home network from the Internet because information is not known in advance such as a private IP address and port, home gateway port number, IP address and port, and IP protocol, that are recorded in the NAPT table in order for packets sent by an outside user hooking up to the Internet to be translated and routed through a home gateway into a private network.

A Virtual Private Network (VPN) is a technology applied to a home gateway in order for a user hooking up to the Internet to be able to get access to network devices from outside. VPNs may vary depending upon environments and network hierarchies applied, but, in the home network environments, 2-layer tunneling protocols such as Point-to-Point Tunneling Protocol (PPTP) and Layer Two Tunneling Protocol (L2TP) are widely used. Each home gateway has a VPN server, and a remote user connected to the Internet operates as a VPN client. The home gateway of each home network can operate as a VPN server or a VPN client in each home network. First, a VPN client requests a VPN server to set up a tunnel by using an IP address on the Internet. If the tunnel is set up, the VPN server authenticates the VPN client, and allocates to the VPN client a private IP address that the client can use inside the home network. The VPN client creates a virtual network interface by using the allocated private IP address, and the interface is connected to the home network and operates like one network. The IP address of the VPN client is used to set up a tunnel to the VPN server, and the private IP address is used in the home network connected through the tunnel.

As described above, the application of the NAPT and VPN technologies to the home gateway enables connections to the Internet through a plurality of network devices at home, and remote users on the Internet to connect to the home network.

However, the above technologies such as NAPT and VPN connect home networks with the Internet, but have a problem that they can not provide connections between an arbitrary home network and another home network. Because a home network uses private IP addresses, a plurality of home networks using different IP addresses may use identical private IP addresses at the same time. If a host connected to a home network transfers data and the host belonging to the home network has the identical IP address as a host belonging to a remote home network, errors occur upon data transmissions since a decision can not be made on a device belonging to which home network the data is transmitted to.

SUMMARY OF THE INVENTION

The present invention has been developed in order to solve the above drawbacks and other problems associated with the conventional arrangement. An aspect of the present invention is to provide a gateway which supports communications between network devices connected to different private networks.

The above aspect and/or other features of the present invention are substantially realized by providing a gateway, which comprises at least one or more public network interfaces connected to public networks; at least one or more private network interfaces connected to private networks; and a control unit. If a tunnel setup request is received from a host being connected to a first private network to set up a tunnel to a second private network being connected to the public networks, the control unit sets up a VPN tunnel by communicating with a gateway of the second private network. If the second private network and the first private network have identical network address, or if the network address of the first private network is included in the network address of the second private network or vice versa, the control unit creates a new network address table in order for the first and the second private networks to use different network addresses in the VPN tunnel, and translating addresses based on the new network address table and forwarding data packets transmitted from the first private network or from the host connected to the second private network.

The control unit comprises a web server for providing a tunnel setup request page in order for the host connected to the second private network to request the setup of the tunnel; a private network Domain Name Server (DNS) processor for obtaining an Internet Protocol (IP) address of the gateway of the first private network from a DNS connected to the public networks with respect to the request of the setup of the tunnel to the first private network by the host connected to the second private network; a Virtual Private Network (VPN) processor operating as a server or a client according to the tunnel setup request transferred through the public network interface or through the private network interface, and creating a tunnel to the first private network; and an NAT/NAPT processor for translating a private IP address into an IP address or an IP address into a private IP address by using a Network Address Port Translation (NAPT) protocol with respect to data packets transmitted to the public network from the first private network or vice versa. If a VPN tunnel is set up between the first private network and the second private network, the control unit translates private IP addresses in the VPN tunnel by using a Network Address Translation (NAT) protocol. The web server can be replaced with a middleware server.

If the tunnel setup request to the second private network is transmitted from the host being connected to the first private network, the VPN processor sends to the gateway of the second private network the tunnel setup request message including the network address of the first private network and a second network address to be used as the network address of the first private network in the VPN tunnel. If a response to the tunnel setup request, which includes a network address of the second private network, the second network address, and a third network address to be used as the network address of the second private network in the VPN tunnel, is received from the gateway of the second private network, the VPN processor sends to the gateway of the second private network an acknowledgement (ACK) including the network address of the first private network, the network address of the second private network, the second network address, and the third network address. The VPN processor creates a private network connection management table through the processes from the generation of the tunnel setup request message to the second private network till the transmission of the ACK message. The private network connection management table includes a network address of the first private network, a network address of the second private network, the second network address, and the third network address, and may further include a domain name of a gateway of the second private network and a server/client state display item according to the VPN operations of a gateway of the second private network.

If the VPN processor generates the private network connection management table, the NAT/NAPT processor establishes a Network Address Translation (NAT) for hosts connected to the private networks.

If a communication request for a second host connected to the second private network is transmitted from a first host connected to the first private network in a state that the VPN tunnel to the second private network is created, the DNS processor enquires to the gateway of the second private network about a third network address of the second host. If a response to the inquiry about the third network address of the second host is received from the gateway of the second private network, the DNS processor sends the third network address of the second host to the first host.

If data packets having the third network address of the second host as a destination address are transmitted from the first host, the control unit forwards the data packets to the gateway of the second private network through the VPN tunnel.

If the tunnel setup message including a network address of the second private network and a second network address to be used as a network address of the second private network in the VPN tunnel is received, the VPN processor sends to the second private network a response message including a network address of the first private network, the second network address, and a third network address to be used as a network address of the first private network in the VPN tunnel. The VPN processor creates a private network connection management table through the processes from the reception of the tunnel setup request message from the second private network till the reception of an ACK message responding to the response message. The private network connection management table includes a network address of the first private network, a network address of the second private network, the second network address, and the third network address, and may further include a domain name of a gateway of the second private network and a server/client state display item according to VPN operations of the gateway of the second private network.

When the VPN processor creates the private network connection management table as above, the NAT/NAPT processor establishes a Network Address Translation (NAT) for hosts connected to the private networks with reference to the private network connection management table.

If an inquiry into a host connected to the second private network is received from the first private network, the DNS processor sends as a response a network address of the host used in the VPN tunnel.

If data packets having the third network address of the host as a destination address are transmitted from the second private network, the control unit sends the received data packets to the host with reference to the NAT.

The control unit comprises a web server for providing a tunnel setup request page in order for the host connected to the first private network to request the setup of the tunnel; a private network Domain Name Server (DNS) processor for obtaining an Internet Protocol (IP) address of the gateway of the second private network from a Domain Name Server (DNS) connected to the public networks with respect to the tunnel setup request by the host being connected to the first private network; a Home-to-Home Tunnelling Initiation Protocol (HTIP) processor for transmitting and receiving a tunnel setup request message in accordance with the tunnel setup request being transmitted through the public network interfaces or transmitted through the private network interfaces, the tunnel setup request message containing a necessary parameter for the setup of tunnel between the first and the second private networks; a Virtual Private Network (VPN) processor operating as a server or a client, and processing such that the tunnel can be set up between the first and the second private networks; and an NAT/NAPT processor for translating a private IP address into an IP address or translating an IP address into a private IP address by using a Network Address Port Translation (NAPT) protocol with respect to data packets transmitted to the public networks from the private networks or vice versa. If a VPN tunnel is set up between the first private network and the second private network and if address translation is required, the NAT/NAPT processor translates private IP addresses in the VPN tunnel by using a Network Address Translation (NAT) protocol. The web server is replaceable with a middleware server.

If the tunnel setup request is received from the host being connected to the first private network to the second private network, the HTIP processor sends to the gateway of the second private network the tunnel setup request message. The tunnel setup request message may include a VPN protocol to be used in the tunnel, the network address of the first private network and second network addresses to be used in VPN tunnel instead of the network address of the first private network. When the HTIP processor receives a response to the tunnel setup request from the gateway of the second private network, the HTIP processor sends to the gateway of the second private network an acknowledgement (ACK). The response may include a VPN protocol to be used in the tunnel, the network address of the second private network, third network addresses to be used in the VPN tunnel instead of the network address of the second private network, the address of the first private network, and second network addresses to be used in the VPN tunnel instead of the network address of the first private network, and the ACK may include the VPN protocol, the network address of the first private network, the network address of the second private network, the second network address, and the third network address. When a READY message, which includes a VPN protocol to be used in the tunnel, third network address to be used in the VPN tunnel instead of the network address of the second private network, the address of the first private network, and second network address to be used in the VPN tunnel instead of the network address of the first private network, is received, the HTIP processor sets the VPN processes to be a VPN client, and causes the VPN client to be driven.

The HTIP processor generates a private network connection management table, by going through the processes from the generation of tunnel setup request message with respect to the second private network till the reception of the READY message. The private network connection management table may include a network address of the first private network, a VPN protocol of the tunnel, an ID of the tunnel, a network address of the second private network, the second network address and the third network address, and may further include a domain name of the gateway of the second private network and a server/client state display item which displays server/client state in accordance with the VPN operation of the gateway of the second private network.

The VPN tunnel is formed between the first and the second private networks, and if address translation is required at both ends of the VPN tunnel, the HTIP processor controls the NAT/NAPT processor so that address translation can be set at both ends of the VPN tunnel with reference to the private network connection management table.

In a state that the VPN tunnel is set up between the first and the second private network, if a communication request is transmitted from the first host of the first private network to the second host of the second private network, the DNS processor enquires to the gateway of the second private network about the IP address corresponding to the domain name of the second host. If a response is received from the gateway of the second private network, the DNS processor transmits the received response to the first host.

If data packets, which are destined to the IP address of the second host, are transmitted from the first host, the control unit forwards the data packets to the gateway of the second private network through the VPN tunnel.

If a tunnel setup request message is received from the second private network, the HTIP processor transmits a response message to the second private network. The tunnel setup request message may include a VPN protocol of the tunnel, a network address of the second private network, and second network addresses to be used in the VPN tunnel instead of the network address of the second private network, and the response message may include the VPN protocol of the tunnel, the network address of the first private network, third network addresses to be used in the VPN tunnel instead of the network address of the first private network, the network address of the second private network and the second network addresses.

If ACK message is received from the second private network, the HTIP processor sets the VPN processor to be a VPN server, and sends a READY message to the gateway of the second private network. The READY message may include a VPN protocol of the tunnel, a network address of the first private network, a third network address to be used in the VPN tunnel instead of the network address of the first private network, a network address of the second private network, and a second network address to be used in the VPN tunnel instead of the network address of the second private network.

The HTIP processor generates a private network connection management table, by going through the processes from the reception of tunnel setup request message from the second private network till the transmission of READY message in response to the response message. The private network connection management table may include a VPN protocol of the tunnel, an ID of the tunnel, a network address of the first private network, a network address of the second private network, the second network address and the third network address, and may further include a domain name of the gateway of the second private network and a server/client state display item to display server/client state in accordance with the VPN operation of the gateway of the second private network.

If a VPN tunnel is formed between the first and the second private networks, and an address translation is required at both ends of the VPN tunnel, the HTIP processor controls the NAT/NAPT processor such that address translation can be set at both ends of the VPN tunnel with reference to the private network connection management table.

If an inquiry regarding the host connected to the first private network is received from the second private network, the DNS processor transmits a network address of the host used in the VPN tunnel as a response.

If data packets, which are destined to the third network address of the host, are transmitted from the second private network, the control unit translates the destination address of the data packets with reference to the translation table of the NAT/NAPT processor, and transmits the data packets to the host.

The gateway according to certain embodiments of the present invention as described above enables networking from private networks to the public network (Internet) as well as networking from the Internet to the private network, including networking from a private network to a different private network, so users can expand a networking range more.

BRIEF DESCRIPTION OF THE DRAWINGS

The above aspects and features of the present invention will be more apparent by describing certain embodiments of the present invention with reference to the accompanying drawings, in which:

FIG. 13 is a signal flow view for explaining a VPN tunnel setup process between two private networks A and B when the expanded network ID of the private network A is included in the expanded network ID of the private network B.

DETAILED DESCRIPTION OF THE PREFERRED EMBODIMENT

Figure 1:
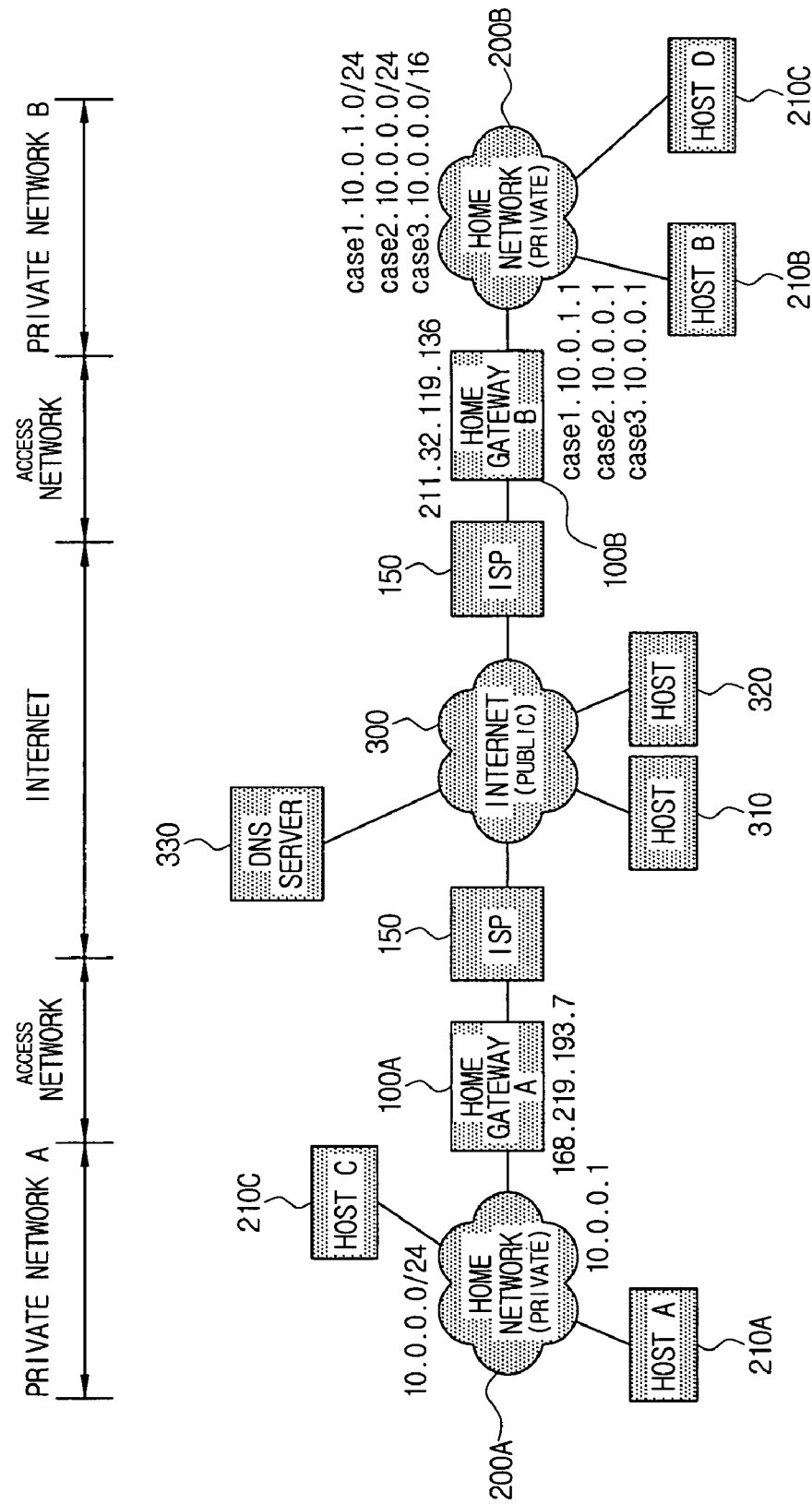
FIG. 1 is a view showing a network structure including a gateway according to an embodiment of the present invention.

Certain embodiments of the present invention will be described in greater detail with reference to the accompanying drawings.

In the following description, same drawing reference numerals are used for the same elements even in different drawings. The matters defined in the description such as a detailed construction and elements are those provided to assist in a comprehensive understanding of the invention. Thus, it is apparent that the present invention can be carried out without those defined matters. Also, well-known functions or constructions are not described in detail since they would obscure the invention in unnecessary detail.

Additionally, a single reference number may be used to represent a plurality of elements in the description.

FIG. 1 is a view showing a network structure including home gateways according to an embodiment of the present invention. The network includes private networks 200A and 200B, access networks, and the Internet 300. The private networks 200A and 200B are connected to private network hosts 210A and 210C and private hosts 210B and 210D, respectively, and a DNS server 330 and a plurality of public network hosts 310 and 320 are connected to the Internet 300. The private networks 200A and 200B and the Internet 300 are connected to each other through access networks including ISPs 150 and home gateways 100A and 100B.

The home gateways A and B (100A and 100B) connecting the private networks A and B (200A and 200B) and the Internet 300 are each assigned an IP address from each of the ISP 150 and the assigned IP address are registered to a DNS server 330 connected to the Internet. The home gateways A and B (100A and 100B) each provide services through an NAPT protocol and a VPN so that the hosts A, B, C and D (210A, 210B, 210C and 210D) on each private network and the hosts 310 and 320 connected to the Internet 300 can communicate with one another. Further, the home gateways 100A and 100B provide services in order for the hosts A and C (210A and 210C) on one of the private networks A and B (200A and 200B) to mutually communicate with the hosts B and D (210B and 210D) connected to the other of the private networks A and B (200A and 200B). Accordingly, upon a connection request from one host (for example, a host A) on a private network A (200A, for example) to another host (for example, a host B) of the private network B (200B, for example), the home gateway A (100A) creates a VPN tunnel to a counterpart home gateway B (100B) for communications, and different private IP addresses to be used for the VPN tunnel are allocated to the hosts 210 connected to the respective private networks A and B (200A and 200B) so that the host A (210A, for example) or the host C (210C, for example) connected to the private network A (200A, for example) can mutually communicate with the host B (210B, for example) or the host D (210D, for example) connected to the private network B (200B, for example) through a Network Address Table (NAT) at both ends of the tunnel.

Figure 2:
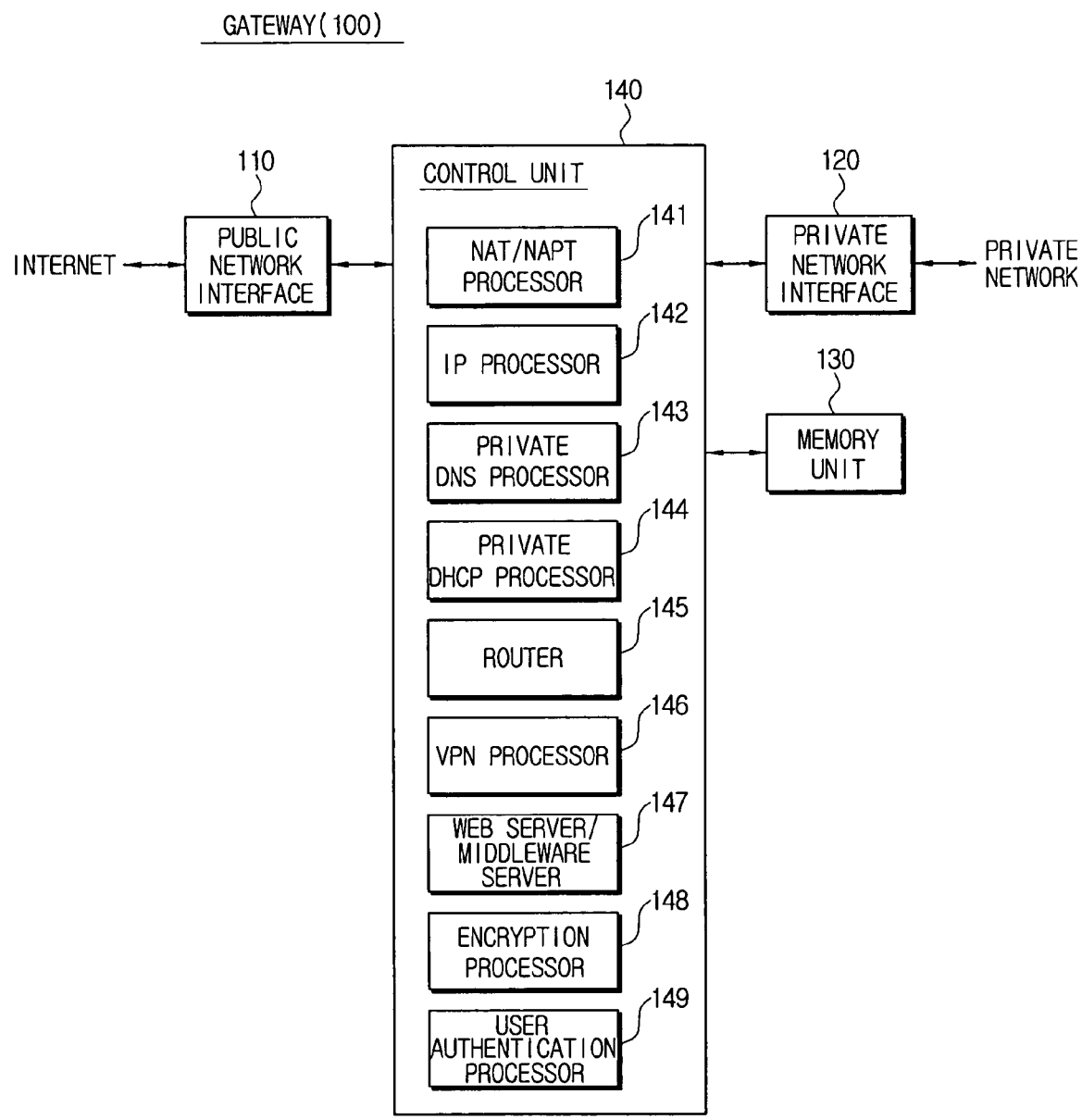
FIG. 2 is a schematic block diagram of the gateway of FIG. 1.

FIG. 2 is a block diagram for showing a gateway according to an embodiment of the present invention. The gateways 100 each include a public network interface 110, a private network interface 120, a memory unit 130, and a control unit 140.

At least two or more interfaces are provided as above, and at least one of the interfaces is a public network interface, and at least one of them is a private network interface. The public network interface 110 is physically connected to the Internet 300 by an ADSL, Cable modem or Ethernet, and has one IP address allocated from the ISP 150. The private network interface 120 can be configured with an Ethernet, wireless LAN, or home PNA in wire and/or wireless manner, and the control unit 140 has private IP addresses. The network addresses used for a private network are randomly selected out of addresses allowed for use by the Internet Assigned Numbers Authority (IANA).

The memory unit 130 stores programs related to the system operations and newly generated and updated data.

The control unit 140 has an NAT/NAPT processor 141, an Internet Protocol (IP) processor 142, a Domain Name Service (DNS) processor 143, a Dynamic Host Configuration Protocol (DHCP) processor 144, a router 145, a VPN processor 146, a web/middleware server 147, an encryption processor 148, and a user authentication processor 149.

The NAT/NAPT processor 141 translates a private IP address into an IP address for packets transferred from a private network to the Internet or from the Internet to a private network, or translates an IP address into a private address. Further, the NAT/NAPT processor 141 uses the NAT protocol to translate addresses in a VPN tunnel in case those private networks are connected to each other by using the VPN tunnel. The NAT/NAPT processor 141 continuously generates and updates NAT and NAPT tables of the memory unit 130.

The IP processor 142 processes an IP datagram (or an IP packet) transferred from the public interface 110 and the private network interface 120.

The router 145 sets up an optimum path an external host connected to the public network and a host connected to a private network. The router 145 continuously generates and updates a routing table of the memory unit 130.

The DNS processor 146 manages domain names and private IP addresses for hosts inside a private network. Further, if there occur inquiries into hosts outside a private network from hosts inside the private network, the DNS processor 146 obtains answers from the DNS server 330 on the Internet or a home gateway located on a previous stage of the other private network for responses. The VPN processor 146 manages a DNS table related to hosts inside a private network.

The DHCP processor 144 responds to requests of hosts inside a private network for available private IP addresses, gateway address, DNS processor address, and so on, when network devices inside a private network boots. The DHCP processor 144 acquires a domain name of a host as part of a response to a host's request, and transfers the acquired domain name to the DNS processor 146, to generate and update the DNS table.

The web/middleware server 147 provides a way that a user of a private network can request a setup of a tunnel to a different private network. The user can request the service by using a web browser or a middleware client.

The VPN processor 146 operates as a VPN server with respect to hosts on the Internet, or operates as a VPN server or a VPN client to enable connections to different private networks. Further, if a host inside a private network requests a connection to a different private network through the web/middleware server 147, the VPN processor 146 sets up a VPN tunnel by communicating with the different private network, and sets up an NAT at the end of the VPN tunnel based on a network address of the private network. Information necessary for connections to other private networks is managed by generating a private network connection management table, and data generated in table is stored in the memory unit 130. The private network connection management table includes network address of a self-private network, network addresses of other private networks, network addresses of self-private network to be used in a VPN tunnel, and network addresses of other private networks to be used in the VPN tunnel, and can further include server/client state display items according to a domain name of a counterpart private network gateway and VPN operations of the counterpart private network gateway.

The encryption processor 148 encrypts packets communicating between a private network and a public network or between a private network and another private network.

The user authentication processor 149 carries out an authentication process on external users who want to get access to a private network from a public network or users who get access for configuration changes and the like to a private network gateway.

When setting up a VPN tunnel to a different private network, the above gateway carries out operations corresponding to each of three occasions as follows. Descriptions will be made on the individual occasions with reference to FIG. 1.

First, there may exist an occasion that expanded network IDs (multiplication of a network ID and a subnet mask) of the private network A (200A, for example) and the private network B (200B, for example) are different from each other. For example, when a network ID of the private network A (200A, for example) is set to 10.0.0.0/24 and a network ID of the private network B (200B, for example) is set to 10.0.1.0/24 (case 1), an expanded network ID of the private network A (200A, for example) becomes 10.0.0.x, and an expanded network address of the private network B becomes 10.0.1.x, so they become different from each other. In this occasion, the private network A and the private network B can communicate with each other only with a setup of a VPN tunnel.

Second, there may exist an occasion that expanded network IDs of the private network A and the private network B are identical to each other (case 2). For example, when the network IDs of the private network A and the private network B are all set to 10.0.0.0/24, all the expanded network IDs of the private network A (200A, for example) and the private network B (200B, for example) become 10.0.0.x so that they are identical to each other. In this case, if the host C (210C) has the same IP address as the host B (210B) has when the host A (210A, for example) on the private network A (200A) tries to send packets to the host B (210B, for example) on the private network B (200B), the home gateway A (100A) generates a transmission error since it does not know where to send packets transferred from the host A (210A), the host B (210B) or the host C (210C), so that no communications are made between the two private networks. Accordingly, in this situation, a new IP address is assigned which can be used in a tunnel set up between the private network A (200A) and the private network B (200B).

For example, the private network A is assigned a network address of 10.0.1.0/24, and the private network B is assigned a network address of 10.0.2.0/24, and the NAT is carried out at both ends of the VPN tunnel. As a result, viewing the hosts 210B and 210D on the private network B (200B) from the private network A (200A), the hosts on the private network B (200B) are recognized with a network address of 10.0.2.x, and, when viewed from the private network B (200B), the hosts 210A and 210C on the private network A (200A) are recognized with a network address of 10.0.2.y, so that mutual communications can be made between the hosts 210A and 210C of the private network A (200A) and the hosts 210B and 210D of the private network B (200B).

Third, there may exist an occasion that and network ID of the private network A is included in a network ID of the private network B. For example, when the private network A (200A) is given 10.0.0.0/24 and the private network B (200B) is given 10.0.0.0/16 (case 3), an expanded network ID of the private network A (200A) becomes 10.0.0.x and an expanded network ID of the private network B (200B) becomes 10.0.x.x so they are different from each other, but the 10.0.0.x is included as part of 10.0.x.x. Even in this occasion, a VPN tunnel is created between the private network A (200A) and the private network B (200B), network addresses are allocated to the private network A (200A) and the private network B (200B) with 10.0.1.0/24 and 10.1.0.0/16 respectively, and the NAT is carried out at both ends of the tunnel. As a result, when viewed from the private network A (200A), the hosts on the private network B (200B) are seen with addresses of 10.1.x.y, and, when viewed from the private network B (200B), the hosts on the private network A (200A) are seen with addresses of 10.0.1.z, so that the hosts of the private network A (200A) can communicate with the hosts of the private network B (200B).

In the above three occasions, since different expanded network IDs of the private network A (200A) and the private network B (200B) enable communications therebetween through only a setup of a VPN tunnel therebetween without additional configurations.

Hereinafter, description will be made on a VPN tunnel creation and a packet transfer process between two private networks according to the above three occasions.

Figure 3:
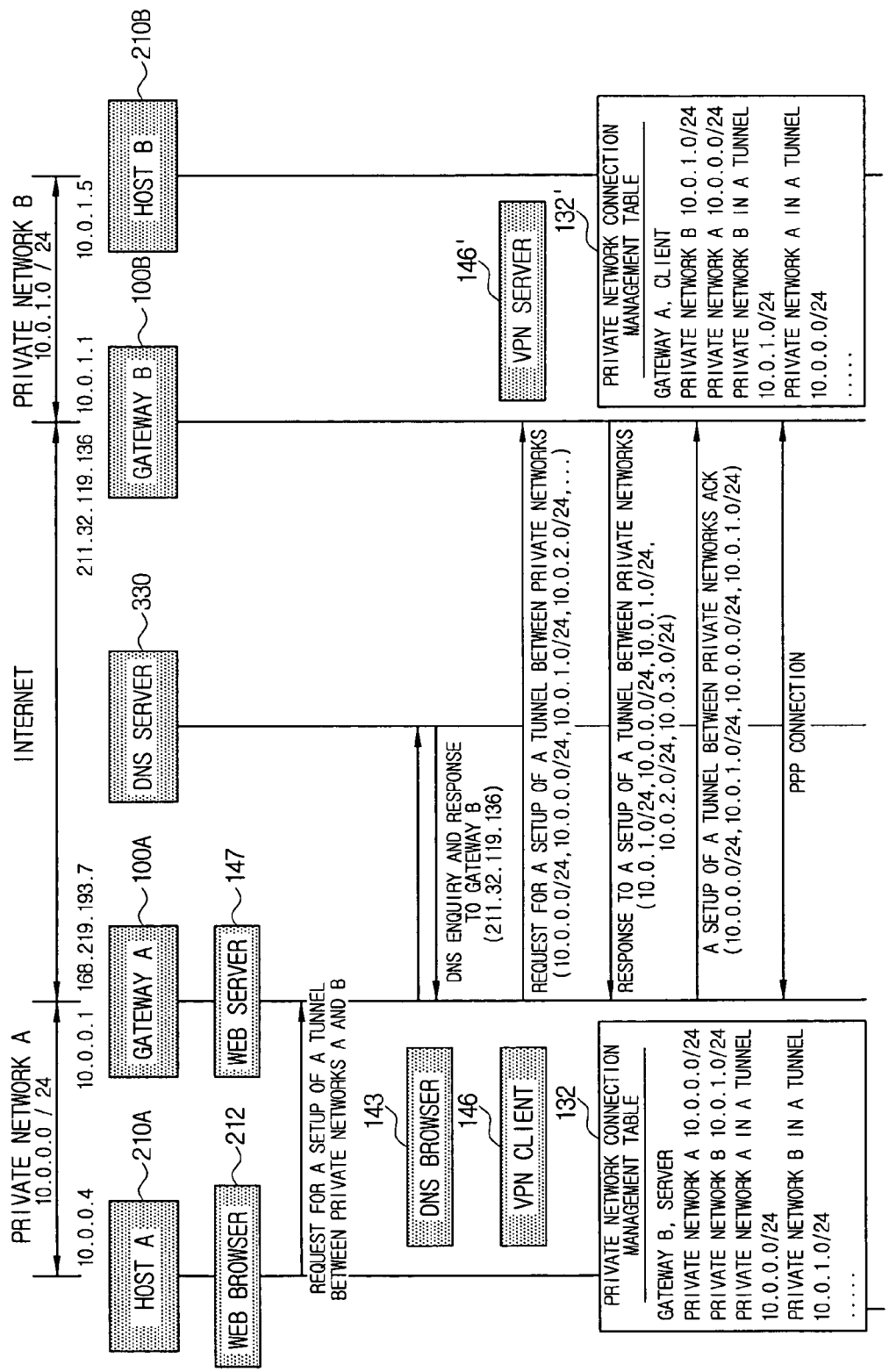
FIG. 3 is a signal flow view for explaining a process for setting up a VPN tunnel between two private networks having different expanded network IDs.

FIG. 3 is a signal flow chart for explaining a process for setting up a VPN tunnel between two private networks having different expanded network IDs. First, a user of the private network A (200A) requests a setup of a tunnel to the private network B (200B) on a tunnel setup request page provided by a web server 147 of the gateway A (100A) through a web browser 212 at the host A (210A), the gateway A (100A) requested to set up a tunnel between the private network A (200A) and the private network B (200B) acquires an IP address (211.32.119.136) of the gateway B (100B) from DNS server 330 on the Internet through the DNS processor 143. Next, the gateway A (100A) launches a client program in the VPN processor 146 and requests a VPN processor 146' of the gateway B (100B) to create a tunnel. In a message requesting a setup of a tunnel between private networks is included a network address 10.0.0.0/24 of the private network A (200A) and network addresses (10.0.0.0/24, 10.0.1.0/24, 10.0.2.0/24, . . . ) to be used instead of network addresses of the private network A (200A) in the VPN tunnel. At this time, since the NAT is not necessary in the VPN tunnel if network addresses of the private network A (200A) and the private network B (200B) are different, the address 10.0.0.0/24 of the private network A (200A) is selected as it is, and, in case that expanded network addresses of the private network A and the private network B are identical to each other, an available address of 10.0.1.0/24, 10.0.2.0/24, . . . is selected.

The gateway B (100B), if a message requesting a tunnel creation between private networks from the gateway A (100A), transmits a response message on the tunnel creation between the private networks from the VPN processor 146 to the gateway A (100A). In the response message is included a network address 10.0.1.0/24 of the private network B (200B), a network address 10.0.0.0/24 to be used instead of a network address of the private network A (200A) in the VPN tunnel, and network addresses 10.0.1.0/24, 10.0.2.0/24, 10.0.3.0/24, . . . to be used instead of a network address of the private network B (200B) in the VPN tunnel.

The gateway A (100A) receiving the response message transmits an acknowledgement (ACK) of the tunnel setup between the private networks to the gateway B (100B). The ACK includes a network address 10.0.0.0/24 of the private network A (200A), a network address 10.0.1.0/24 of the private network B (200B), a network address 10.0.0.0/24 to be used for a network address of the private network A (200A) in the VPN tunnel, and a network address 10.0.1.0/24 to be used for a network address of the private network B (200B) in the VPN tunnel. At this time, if the address of the private network A (200A) is identical to the network address to be used for a network address of the private network A (200A) in the VPN tunnel, it means that the NAT does not occur in the VPN tunnel, and, if not identical, it means that the NAT occurs.

After receiving and transferring the ACK messages, private network connection management tables 132 and 132' are generated in the gateway A (100A) and the gateway B (100B), respectively. The private network connection management table 132 includes a domain name of a counterpart gateway, an item indicating whether the counterpart gateway is a VPN server or a VPN client, a network address of the private network A (200A), a network address of the private network B (200B), a network address to be used for a network address of the private network A (200A) in the VPN tunnel, a network address to be used for a network address of the private network B (200B) in the VPN tunnel, and so on.

A table generated by the gateway A (100A) includes a domain name (gateway B) of the gateway B (100B), an item (server) indicating that the gateway B is a VPN server, a network address (10.0.0.0/24) of the private network A, a network address (10.0.0.0/24) of the private network A, a network address (10.0.1.0/24) of the private network B, a network address (10.0.0.0/24) to be used for a network address of the private network A in the VPN tunnel, a network address (10.0.1.0/24) to be used for a network address of the private network B in the VPN tunnel, and so on.

As above, if an ACK signal is exchanged between the two private networks, a VPN tunnel is created between the gateway A (100A) and the gateway B (100B), and a Point-to-Point Protocol (PPP) connection is established in the tunnel. Thereafter, packets transmitted to the end of the VPN tunnel of the gateway A (100A) from the host A (210A) are transferred to the end of the VPN tunnel of the gateway B (100B) through the PPP connection.

Figure 4:
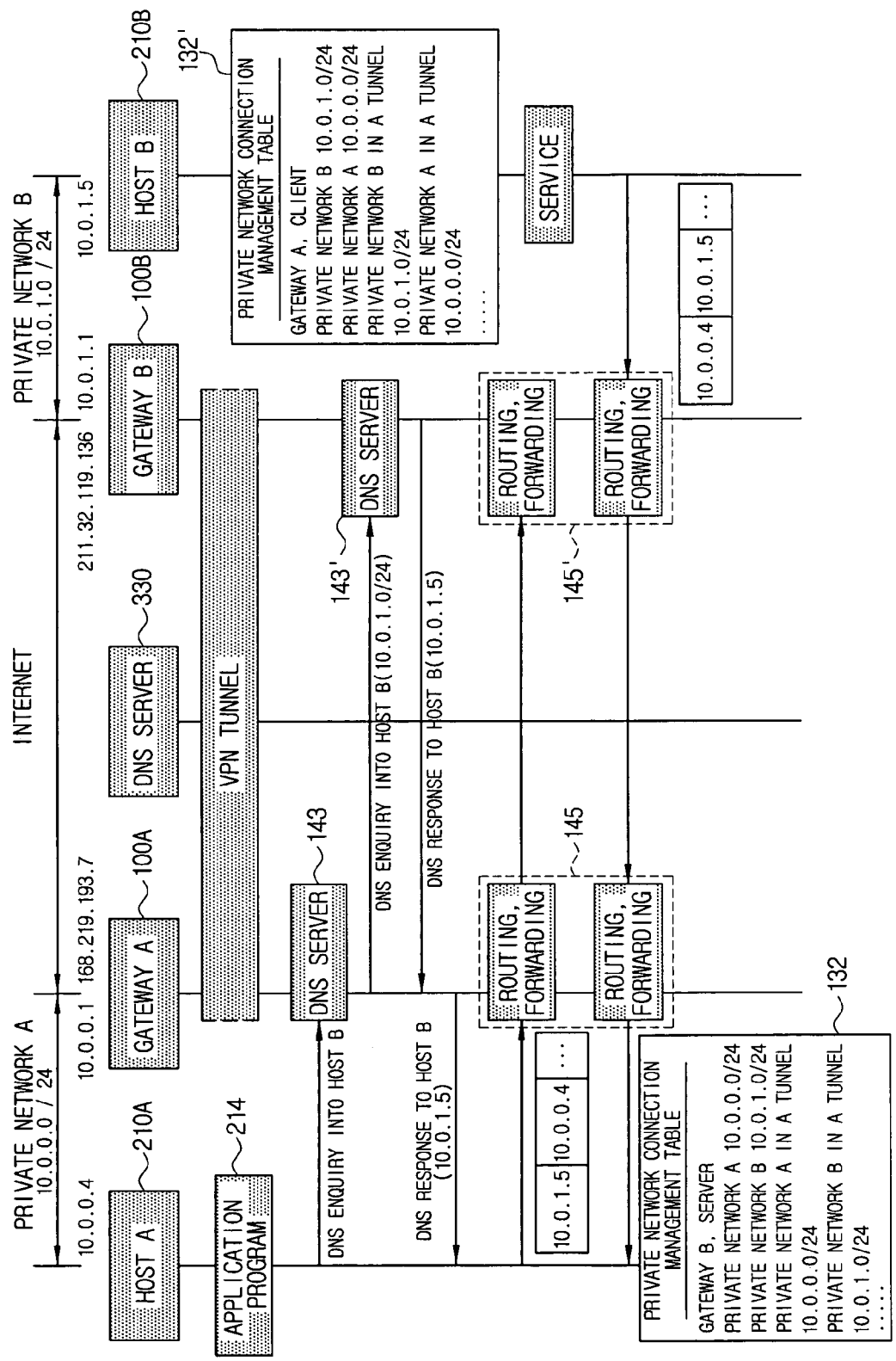
FIG. 4 is a signal flow view for explaining a packet transfer process between hosts A and B through a tunnel between a private network A and a private network B by a process of FIG. 3.

FIG. 4 is a signal flow view for explaining a packet transfer process between the host A (210A) and the host B (210B) through a tunnel set up between the private network A (200A) and the private network B (200B) by the process of FIG. 3. First, a user of the private network A (200A) knows a domain name of the host B (210A), and an application program installed in the host A (210A) transmits a DNS inquiry to the gateway A (100A) in order to know an IP address corresponding to the domain name of the host B (210B). Accordingly, the DNS processor 143 of the gateway A (100A) looks up the private network connection management table 132. If a VPN tunnel is established between the private network A (200A) and the private network B (200B), the DNS processor 143 sends to the gateway B (100B) the DNS inquiry into the host B (210B). Thereafter, the DNS processor 143 of the gateway A (100A) looks up the private network connection management table 132 first. Further, if there is a VPN tunnel established between the private network A (200A) and the private network B (200B), the DNS inquiry into the host B (210B) is sent to the gateway B (100B).

If the DNS inquiry is transferred from the gateway A (100A) to the gateway B (100B) as above, the DNS processor 143' of the gateway B (100B) transfers to the gateway A (100A) a response message with a network address 10.0.1.5 indicating the host B (210B) in the VPN tunnel instead of a network address of the host B (210B).

The gateway A (100A) forwards to the host A (210A) a private IP address 10.0.1.5 responded to the host B (210B) from the DNS processor 143' of the gateway B (100B).

If a private IP address of the host B (210B) is received from the gateway A (100A), the host A (210A) transmits packets to the gateway A (100A) by writing the received private IP address (10.0.1.5) for a destination address and the private IP address (10.0.0.4) of the host A (210A) for a source address.

The gateway A (100A), if packets are received from the host A (210A), transfers the received packets to the end of a tunnel of the gateway A (100A) with reference to a routing table 145 and a forwarding setting. Since a PPP connection is set in the VPN tunnel between the gateway A (100A) and the gateway B (100B), the packets sent to the end of a tunnel of the gateway A (100A) is transmitted to the end of a tunnel of the gateway B (100B).

The gateway B (100B), if the packets are transferred through the VPN tunnel, forwards the packets to the host B (210B) with reference to a routing table 145' and a forwarding setting.

The host B (210B), if the packets are received, sends a response by writing a private IP address (10.0.1.5) of the host B (210B) for the source address and a private IP address (10.0.0.4) of the host A (210A) for the destination address.

Thereafter, the host A (210A) and the host B (210B) repeats the above packet transfer process through the tunnel formed between the private network A (200A) and the private network B (200B).

Figure 5:
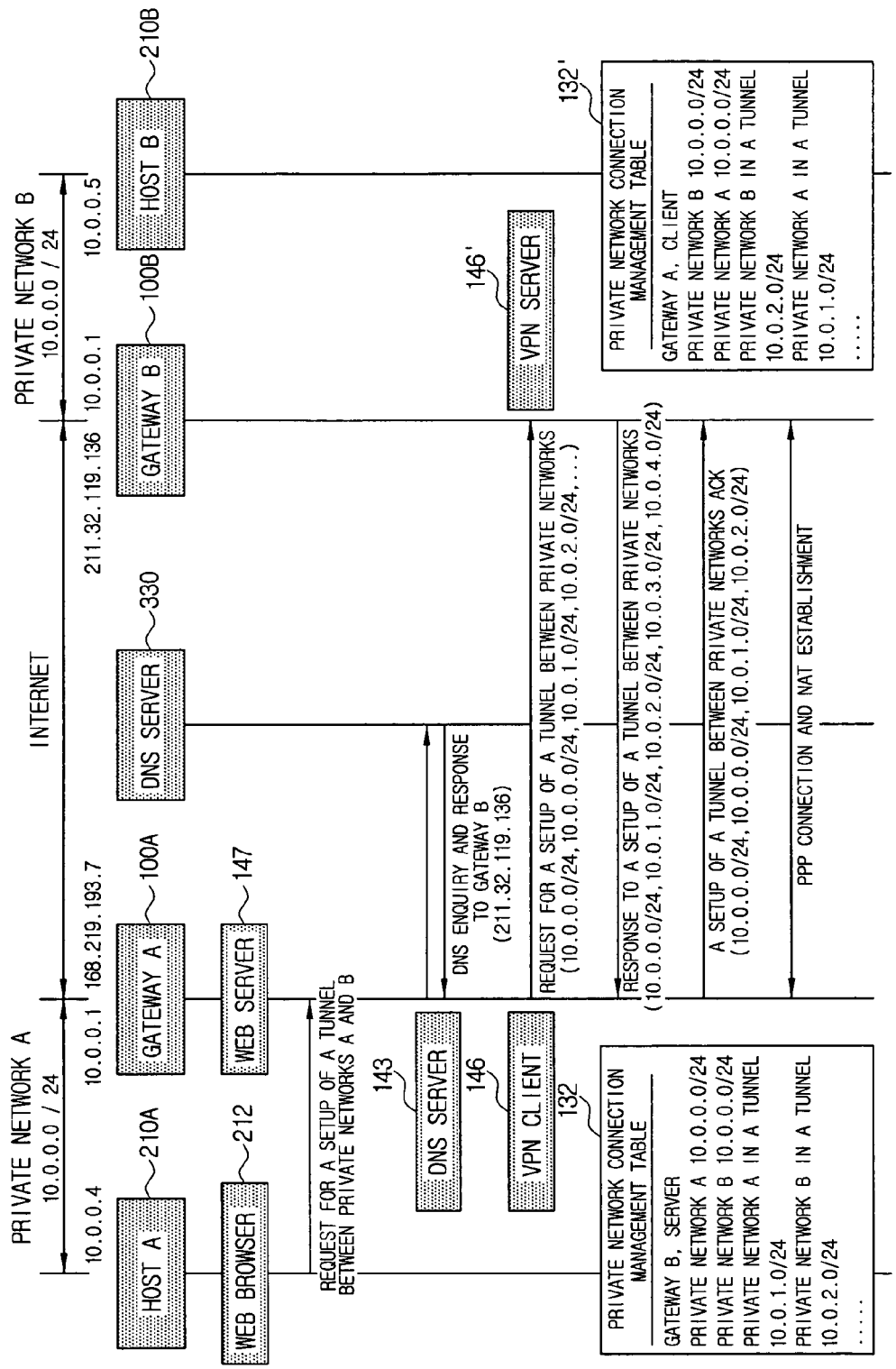
FIG. 5 is a signal flow view for explaining a VPN tunnel setup process of two private networks having the same expanded network IDs.

FIG. 5 is a signal flow view for explaining a process for a VPN tunnel setup process of two private networks having the same expanded network IDs. First, if a user of the private network A (200A) requests a setup of a tunnel to the private network B (200B) on a tunnel setup request page provided by the web server 147 of the gateway A (100A) through the web browser 212 in the host A (210A), the gateway A (100A) receiving a request for setting up the tunnel between the private network A (200A) and the private network B (200B) obtains an IP address (211.32.119.136) of the gateway B (100B) from the DNS server 330 on the Internet through the DNS processor 143. Next, the gateway A (100A) having the IP address of the gateway B (100B) obtained launches a client program at the VPN processor 146 and requests the VPN processor 146' of the gateway B (100B) to create a tunnel between the private networks. A message requesting a setup of a tunnel between the private networks includes a network address (10.0.0.0/24) of the private network A (200A) and network addresses (10.0.0.0/24, 10.0.1.0/24, 10.0.2.0/24 . . . ) to be used for a network address of the private network A (200A) in the VPN tunnel.

The VPN processor 146' of the gateway B (100B), if a tunnel setup request is received from the gateway A (100A), transfers to the gateway A (100A) a response message to the tunnel setup request between the private networks. The response message includes a network address (10.0.0.0/24) of the private network B (200B) and a network address (10.0.1.0/24) to be used for a network address of the private network A (200A) in the VPN tunnel, and network addresses (10.0.2.0/24, 10.0.3.0/24, 10.0.4.0/24) to be used for a network address of the private network B (200B) in the VPN tunnel.

The gateway A (100A), if the response message is received from the gateway B (100B), sends to the gateway B (100B) an ACK of the tunnel setup between the private networks. The ACK includes a network address (10.0.0.0/24) of the private network A (200A), a network address (10.0.0.0/24) of the private network B (200B), a network address (10.0.1.0/24) to be used for a network address of the private network A (200A) in the VPN tunnel, and a network address (10.0.2.0/24) to be used for a network address of the private network B (200B) in the VPN tunnel. Since the address of the private network A (200A) is not identical to the network address to be used for a network address of the private network A (200A) in the VPN tunnel, the gateway A (100A) recognizes that address translations are used by an NAT protocol.

After receiving and transferring the ACK messages, private network connection management tables 132 and 132' are generated in the gateway A (100A) and the gateway B (100B), respectively. The private network connection management table 132 includes a domain name of a counterpart gateway 100, an item indicating whether the counterpart gateway 100 is a VPN server or a VPN client, a network address of the private network A (200A), a network address of the private network B (200B), a network address to be used for a network address of the private network A (200A) in the VPN tunnel, a network address to be used for a network address of the private network B (200B) in the VPN tunnel, and so on.

A table that the gateway A (100A) generates includes a domain name (gateway B) of the gateway B (100B), an item (server) indicating that the gateway B is a VPN server, a network address (10.0.0.0/24) of the private network A (200A), a network address (10.0.0.0/24) of the private network B (200B), a network address (10.0.1.0/24) to be used for a network address of the private network A (200A) in the VPN tunnel, a network address (10.0.2.0/24) to be used for a network address of the private network B (200B) in the VPN tunnel, and so on.

Through the above process, a VPN tunnel is created between the gateway A (100A) and the gateway B (100B), and a PPP connection is established in the tunnel. Thereafter, packets transmitted to the end of the VPN tunnel of the gateway A (100A) is transferred to the end of the VPN tunnel of the gateway B (100B) through the PPP connection.

If the VPN tunnel is created and the PPP connection is finished, the gateway A (100A) establishes the NAT to the gateway A (100A) of the VPN tunnel with reference to the private network connection management table 132. If the NAT is established, a source address 10.0.0.x is translated into 10.0.1.x when packets are sent from the private network A (200A) to the VPN tunnel through the gateway A (100A), and a destination address 10.0.1.y is translated into 10.0.0.y when packets are sent to the private network A from the VPN tunnel through the gateway A (100A). Further, the gateway B establishes the NAT at the gateway B of the VPN tunnel.

Figure 6:
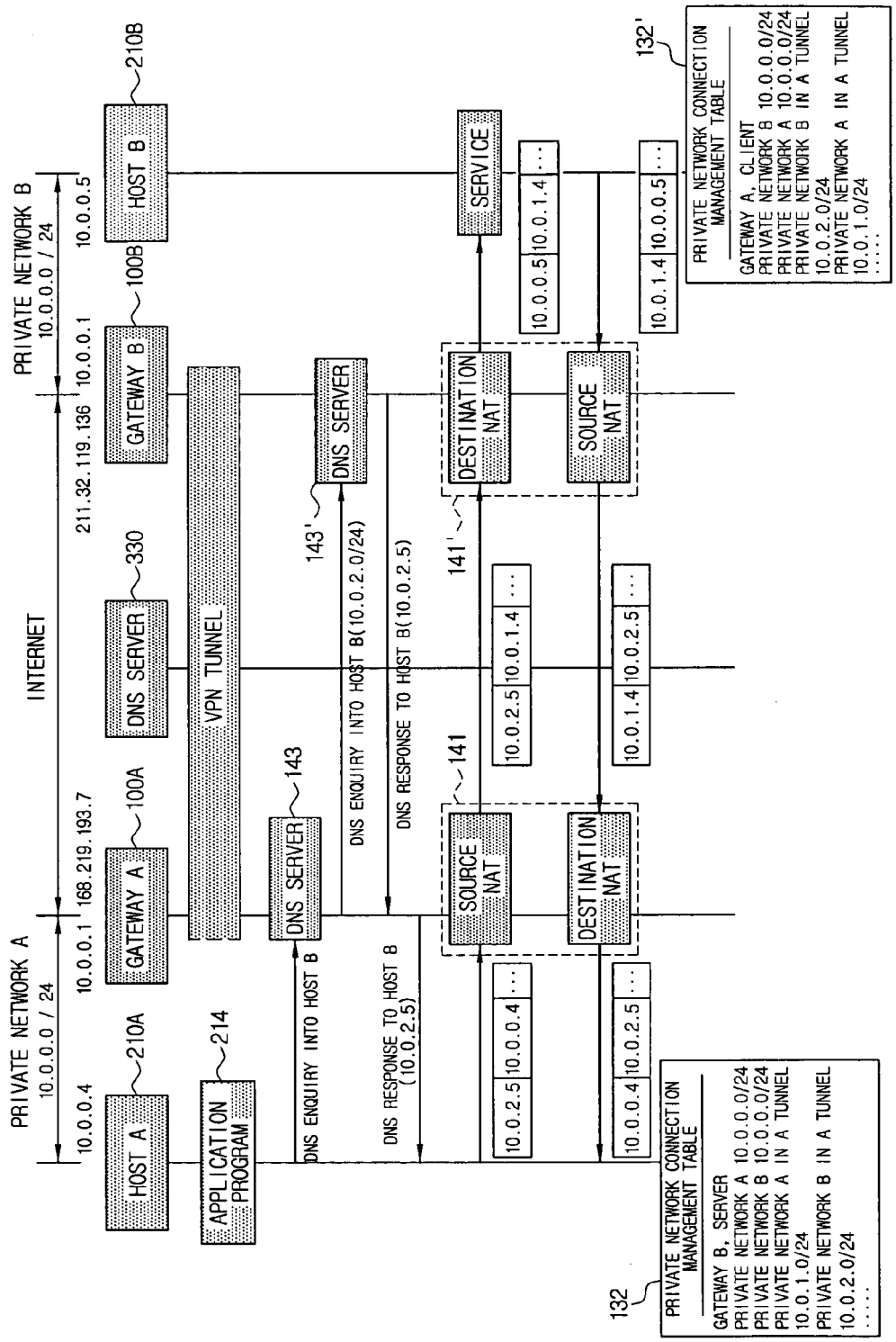
FIG. 6 is a signal flow view for explaining a packet transfer process between a host A and a host B through a tunnel set up between a private network A and a private network B by a process of FIG. 5.

FIG. 6 is a signal flow view for explaining a packet transfer process between the host A (210A) and the host B (210B) through a tunnel set up between the private network A and the private network B by the process of FIG. 3. First, a user of the private network A (200A) knows a domain name of the host B (210B), and, if an application program installed in the host A (210A) transmits to the gateway A (100A) a DNS inquiry into the host B (210B), the DNS processor 143 of the gateway A (100A) looks up the private network connection management table 132. Further, if a VPN tunnel is established between the private network A (200A) and the private network B (200B), the DNS processor 143 sends the DNS inquiry to the gateway B (100B) in order to know a private IP address to be used in the VPN tunnel of the host B (210B) since it is recognized that the NAT is necessary for the packets passing through the tunnel.

The DNS processor 143' of the gateway B (100B), if an inquiry into the host B (210B) is received, transfers to the gateway A (100A) a response message with an IP address to be used in the VPN tunnel of the host B (210B), and the gateway A (100A) sends it back to the host A (210A).

Thereafter, the host A (210A) transfers packets to the gateway A (100A) in order to sent the packets to the host B (210B). A destination address for the packets is written in 10.0.2.5, and a source address is written in 10.0.0.4.

If packets to the host B (210B) are received from the host A (210A), the gateway A (100A) transfers the packets to the end of the tunnel of the gateway A (100A) with reference to the routing table and a forwarding setting. The source address 10.0.0.4 is translated into 10.0.1.4 since the NAT is established at the end of the VPN tunnel of the gateway A (100A). The packets with the source address translated through the NAT are transmitted to the end of the gateway B (100B) since the PPP connection is established for the tunnel between the gateway A (100A) and the gateway B (100B).

The gateway B (100B) translates the destination address 10.0.2.5 into 10.0.0.5 through the NAT established at the end of the VPN tunnel of the gateway B (100B) with respect to the packets transferred to the end of the tunnel of the gateway B (100B) with the source address translated through the NAT as above. The packets having the destination address translated through the NAT as above are transmitted to the host B (210B) with reference to the routing table and the forwarding setting.

Thereafter, the host B (210B) sends a response to the host A (210A), and the above packet transfer process is repeated for communications.

Figure 7:
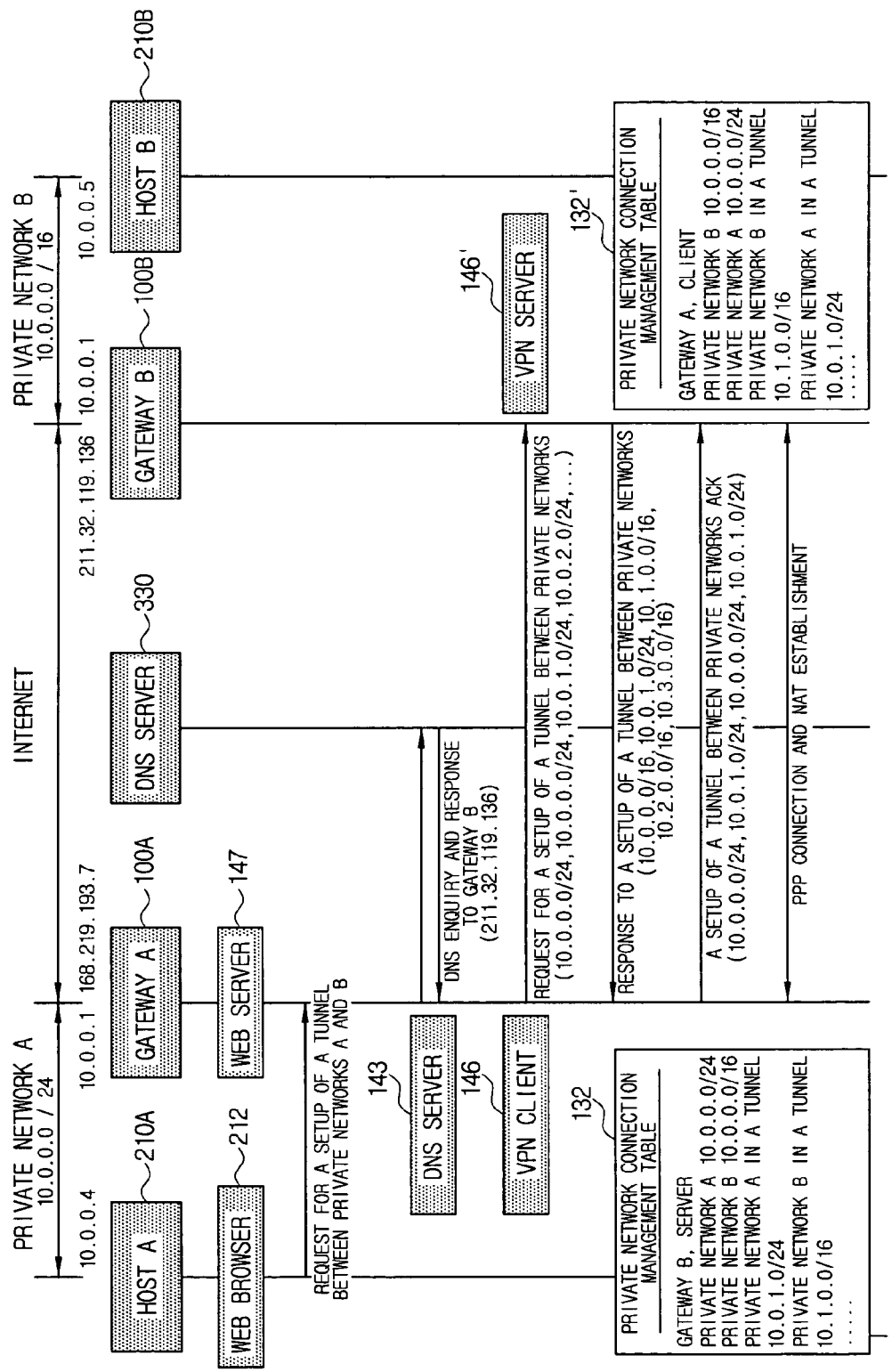
FIG. 7 is a signal flow view for explaining a VPN tunnel setup process between two private networks when an expanded network ID of the private network A is included in an expanded network ID of the private network B.

FIG. 7 is a signal flow chart for explaining a VPN tunnel setup process between two private networks in case that an expanded network ID of the private network A is included in an expanded network ID of the private network B. First, if a user of the private network A (200A) requests a setup of a tunnel to the private network B (200B) on a tunnel setup request page provided by the web server 147 of the gateway A (100A) through the web browser 212 in the host A (210A), the gateway A (100A) receiving a request for setting up the tunnel between the private network A (200A) and the private network B (200B) obtains an IP address (211.32.119.136) of the gateway B (100B) from the DNS server 330 on the Internet through the DNS processor 143. Next, the gateway A (100A) having the IP address of the gateway B (100B) obtained launches a client program at the VPN processor 146 and requests the VPN processor of the gateway B (100B) to create a tunnel between the private networks. A message requesting a setup of a tunnel between the private networks includes a network address (10.0.0.0/24) of the private network A and network addresses (10.0.0.0/24, 10.0.1.0/24, 10.0.2.0/24 . . . ) to be used for a network address of the private network A in the VPN tunnel.

The VPN processor 146' of the gateway B (100B), if a tunnel setup request message is received from the gateway A (100A), transfers a response message to the tunnel setup between the private networks. The response message includes a network address (10.0.0.0/16) of the private network B (200B) and a network address (10.0.1.0/24) to be used for a network address of the private network A in the VPN tunnel, and network addresses (10.1.0.0/16, 10.2.0.0/16, 10.3.0.0/16 . . . ) to be used for a network address of the private network B in the VPN tunnel.

The gateway A (100A), if the response message is received from the gateway B (100B), sends to the gateway B (100B) an ACK of the tunnel setup between the private networks. The ACK includes a network address (10.0.0.0/24) of the private network A (200A), a network address (10.0.0.0/16) of the private network B (200B), a network address (10.0.1.0/24) to be used for a network address of the private network A in the VPN tunnel, and a network address (10.1.0.0/24) to be used for a network address of the private network B in the VPN tunnel. Since the address of the private network A is not identical to the network address to be used for a network address of the private network A in the VPN tunnel, the gateway A (100A) recognizes that the NAT is used.

After receiving and transferring the ACK messages, private network connection management tables 132 and 132' are generated in the gateway A (100A) and the gateway B (100B), respectively. The table that the gateway A (100A) generates includes a domain name of the gateway B (100B), an item indicating that the gateway B (100B) is a VPN server, a network address (10.0.0.0/24) of the private network A, a network address (10.0.0.0/16) of the private network B, a network address (10.0.1.0/24) to be used for a network address of the private network A in the VPN tunnel, a network address (10.1.0.0/16) to be used for a network address of the private network B in the VPN tunnel, and so on.

Through the above process, a PPP connected is set up in a VPN tunnel between the gateway A (100A) and the gateway B (100B). Thereafter, packets transmitted to the end of the VPN tunnel of the gateway A (100A) is transferred to the end of the VPN tunnel of the gateway B (100B) through the PPP connection.

Next, if the VPN tunnel is created and the PPP connection is finished, the gateway A (100A) establishes the NAT at the gateway A (100A) of the VPN tunnel with reference to the private network connection management table 132. If the NAT is established, a source address 10.0.0.x is translated into 10.0.1.x when packets are sent from the private network A to the VPN tunnel through the gateway A (100A), and a destination address 10.0.1.y is translated into 10.0.0.y when packets are sent to the private network A from the VPN tunnel through the gateway A (100A). Likewise, the gateway B (100B) also establishes the NAT at the gateway B of the VPN tunnel.

If the NAT is established at both ends of the VPN tunnel formed between the gateway A (100A) and the gateway B (100B) as above, the host A (210A) and the host B (210B) can mutually communicate through the data packet transfer process of FIG. 6.

Hereinbelow, a gateway according to another embodiment of the present invention will be described.

Figure 8:
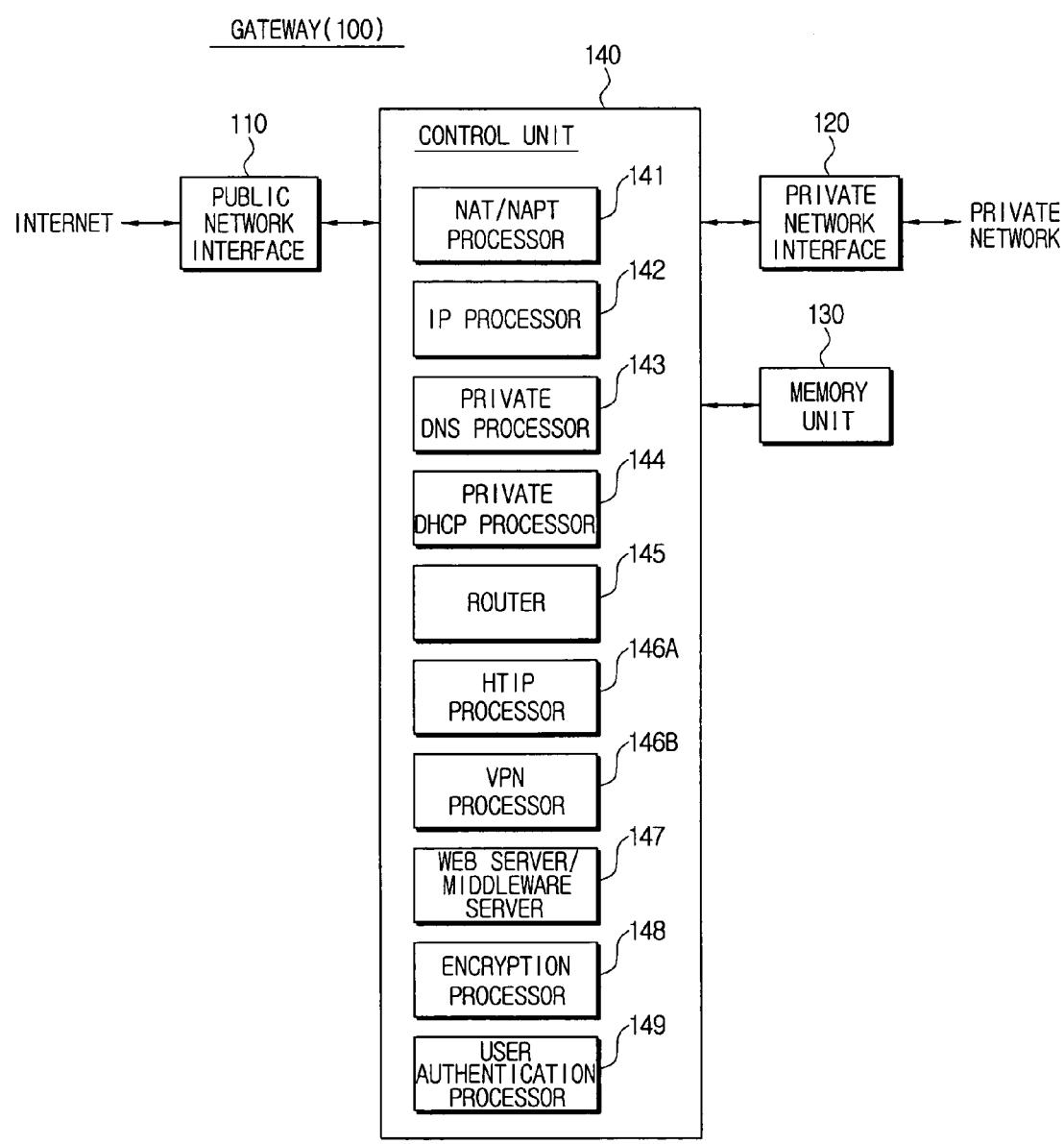
FIG. 8 is a schematic block diagram of the gateway according to another embodiment of the present invention.

FIG. 8 is a block diagram of a gateway according to another embodiment of the present invention. The gateway 100 includes a public network interface 110, a private network interface 120, a memory unit 130 and a control unit 140.

The interface 110, the private network interface 120 and the memory unit 130 have identical operations and functions as those described above. The control unit 140 includes a NAT/NAPT processor 141, an Internet Protocol (IP) processor 142, a Domain Name Service (DNS) processor 143, a Dynamic Host Configuration Protocol (DHCP) processor 144, a router 145, a HTIP processor 146A, a VPN processor 146B, a web/middleware server 147, an encryption processor 148 and a user authentication processor 149.

The NAT/NAPT processor 141, the P processor 142, the DNS processor 143, the DHCP processor 144, the router 145, the web/middleware server 147, the encryption processor 148 and the user authentication processor 149 have the identical operations and functions as those described above.

The HTIP processor 146A negotiates parameters for the creation of tunnel between the other private networks, and accordingly controls the VPN processor 146B and the NAT/NAPT processor 141 using the parameters. The useful parameters may include a type of VPN protocol for use in the creation of VPN tunnel, a network address of self-private network, a network address of other private network, a network address of self-private network for use in VPN tunnel, and a network address of the other private network for use in VPN tunnel.

The HTIP processor 146A enables direct communications between communication devices of the plurality of private networks, irrespective of private IP addresses or type of VPN protocol being used. The parameters resulted from the negotiation, or the list of VPN tunnels created among the private networks, are stored in the memory unit 130. In other words, information necessary for the connection with the other private networks are incorporated into a private network connection management table, and the tablized data are stored in the memory unit 130.

In response to a request delivered through the web/middleware server 147 from a host of a private network for a connection to the other private network, the HTIP processor 146A communicates with the other private networks, negotiates necessary parameters for the creation of VPN tunnel, controls the VPN processor 146B to create VPN tunnel in accordance with the negotiated parameters, and controls the NAT/NAPT processor 141 so that NAT can be set at the end of the VPN tunnel according to the network address of the private network. The private network connection management table may include a VPN protocol being used, a network address of self-private network, a network address of the other private network, a network address of self-private network to be used in VPN tunnel, and a network address of the other private network to be used in VPN tunnel. The private network connection management table may additionally include a domain name of the counterpart private gateway, and a server/client status indicating item in accordance with the VPN operation of the counterpart private gateway.

The VPN processor 146B operates as a VPN server to the host located in the Internet, while operating as a VPN server or a VPN client to enable connection with other private networks. The HTIP processor 146A, if completed negotiation with the HTIP processor 146A' located in the gateway of the other private network, controls the VPN processor 146B to create a VPN tunnel between different private networks.

In forming a VPN tunnel between the other private network, the gateway operates differently mainly in three cases, which include, first, when the private network A (200A) has a different expanded network ID from the private network B (200B), second, when the private network A (200A) has an identical expanded network ID with the private network B (200B), and third, when the network ID of the private network A (200A) is included in the network ID of the private network B (200B). The process of creating VPN tunnel and transferring packet between two private networks will be described in detail below, with reference to the above three cases.

Figure 9:
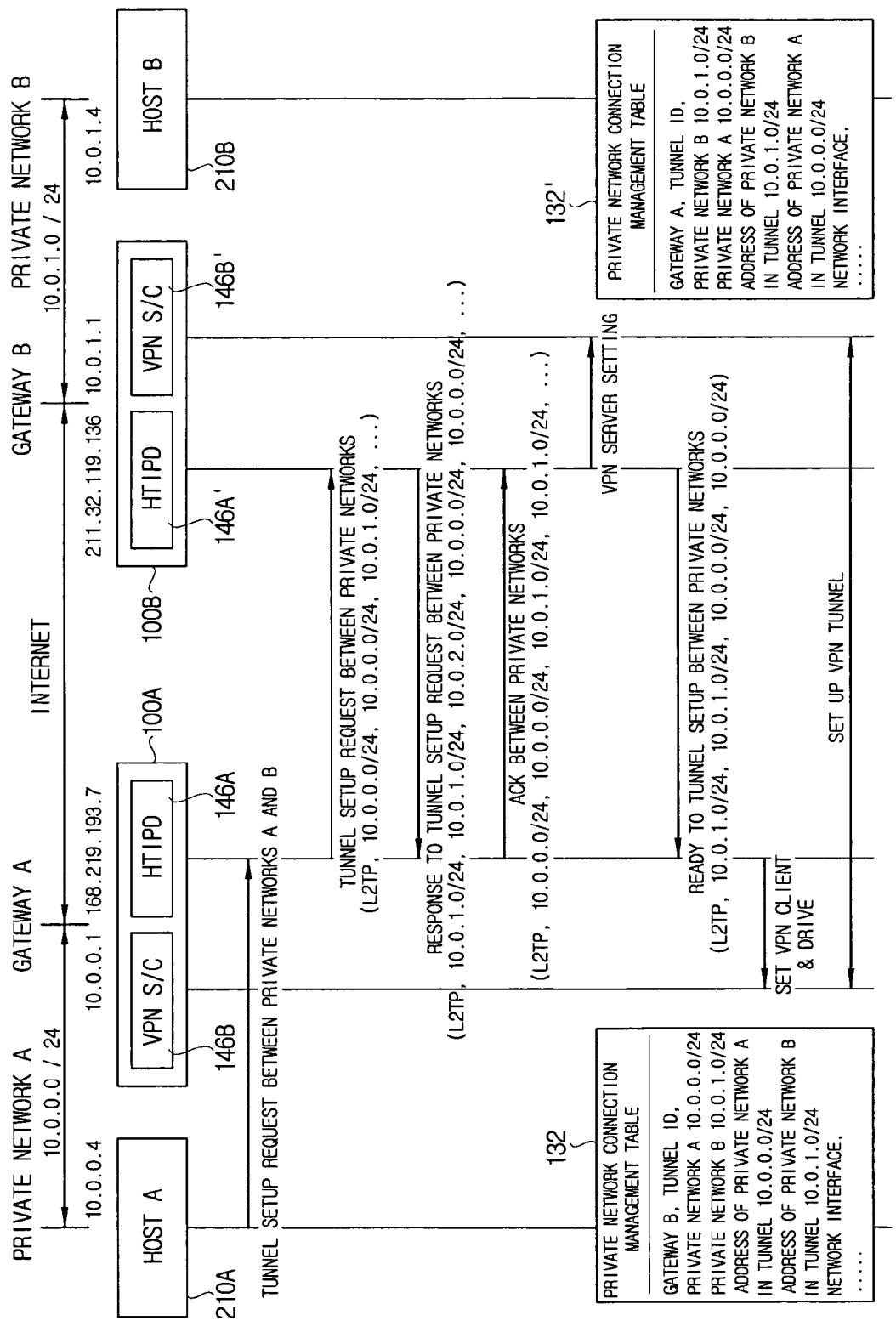
FIG. 9 is a signal flow view for explaining a VPN tunnel setup process between two private networks with different expanded network Ids.

FIG. 9 is a signal flow view, which shows the process of forming a VPN tunnel between two private networks having different expanded network IDs. First, a user of the private network A (200A) sends a request for a setup of a tunnel to the private network B (200B) on a tunnel setup request page provided by the web server 147 of the gateway A (100A) through a web browser 212. Responding to the request, the gateway A (100A) obtains through the DNS processor 143 a public IP address 211.32.119.136 of the gateway B (100B) from the DNS server 330 located in the Internet.

Next, the gateway A (100A) drives a HTIP program at the HTIP processor 146A to request the HTIP processor 146A of the gateway B (100B) to set up a tunnel. The tunnel setup request between private networks may include a VPN protocol to be used, such as L2TP, and network addresses (10.0.0.0/24, 10.0.1.0/24, 10.0.2.0/24, . . . ) to be used in the VPN tunnel instead of the network address of the private network A (200A). If the private network A (200A) and the private network B (200B) have different network addresses, and if the network address of the private network A (200A) is not used to connect the private network B (200B) and a third private network through the VPN tunnel, the network address 10.0.0.0/24 of the private network A is directly selected because there is no need for a NAT in the VPN tunnel. If the expanded network addresses of the private network A (200A) and the private network B (200B) are identical to each other, an available address among the addresses of 10.0.1.0/24, 10.0.2.0/24, . . . is adequately selected.

Upon receiving a request for tunnel setup between the private networks from the gateway A (100A), the gateway B (100B) transmits a tunnel setup response message to the gateway A (100A) through the HTIP processor 146A. The response message may include a VPN protocol to be used, such as L2TP, a network address 10.0.1.0/24 of the private network B (200B), network addresses (10.0.1.0/24, 10.0.2.0/24, 10.0.3.0/24, . . . ) to be used in the VPN tunnel instead of network address of the private network B (200B), a network address 10.0.0.0/24 of the private network A (200A), and a network address 10.0.0.0/24 to be used in the VPN tunnel instead of the network address of the private network A (200A).

Upon receiving a response message, the gateway A (100A) transmits a tunnel setup ACK to the gateway B (100B). The ACK message may include a network address 10.0.0.0/24 of the private network A (200A), a network address 10.0.1.0/24 of the private network B (200B), and a network address 10.0.0.0/24 to be used in the VPN tunnel instead of the network address of the private network B (200B). If the address of the private network A (200A) is identical to the network address, which is to be used in the VPN tunnel instead of network address of private network A (200A), NAP does not occur in the VPN tunnel, while NAP occurs when the network addresses do not match with each other.

After the ACK messages are sent out and received, private network connection management tables 132 and 132' are created at the gateway A (100A) and the gateway B (100B). The private network connection management table 132 may include a domain name of a counterpart gateway, a VPN protocol being used such as L2TP, a tunnel ID between the private networks, an item indicating whether the counterpart gateway is VPN server or client, a network address of the private network A (200A), a network address of the private network B (200B), a network address to be used in the VPN tunnel instead of the network address of the private network A (200A), and a network address to be used in the VPN tunnel instead of the network address of the private network B (200B).

The table generated by the gateway A (100A) may include a domain name of the gateway B (100B) such as 'gateway B', an item (a server) indicating the gateway B to be VPN server, a network address 10.0.0.0/24 of the private network A (200A), a network address 10.0.1.0/24 of the private network B (200B), a network address 10.0.0.0/24 to be used in the VPN tunnel instead of the network address of the private network A (200A), and a network address 10.0.1.0/24 to be used in the VPN tunnel instead of the network address of the private network B (200B).

When the ACK message is received, the gateway B (100B) sets the VPN processor 146B' to be the VPN server to create a VPN tunnel under a VPN protocol to be used. If everything is prepared for the tunnel creation including the setting of VPN processor 146B' as the VPN server, the HTIP processor 146A' of the gateway B (100B) sends out a READY message to the gateway A (100A), thereby notifying that preparation for the tunnel creation between the private networks has been completed. The READY message may include a VPN protocol in use, such as L2TP, a network address 10.0.0.0/24 of the private network A (200A), a network address 10.0.1.0/24 of the private network B (200B), a network address of the private network A (200A) to be used in the VPN tunnel, and a network address 10.0.1.0/24 of the private network B (200B) to be used in the VPN tunnel.

When the READY message is received, the gateway A (100A) sets the VPN processor 146B to be a VPN client of the gateway B (100B) under the VPN protocol to be used. The HTIP processor 146A drives the VPN client, and as a result, a VPN (L2TP) tunnel is created between the gateway A (100A) and the gateway B (100B).

As described above, after the exchange of the ACK signal and READY signal between two private networks, a VPN tunnel is created, and a packet, which is transferred from the host A (210A) to the end of the VPN tunnel of the gateway A (100A), is transferred to the end of the VPN tunnel of the gateway B (100B).

Figure 10:
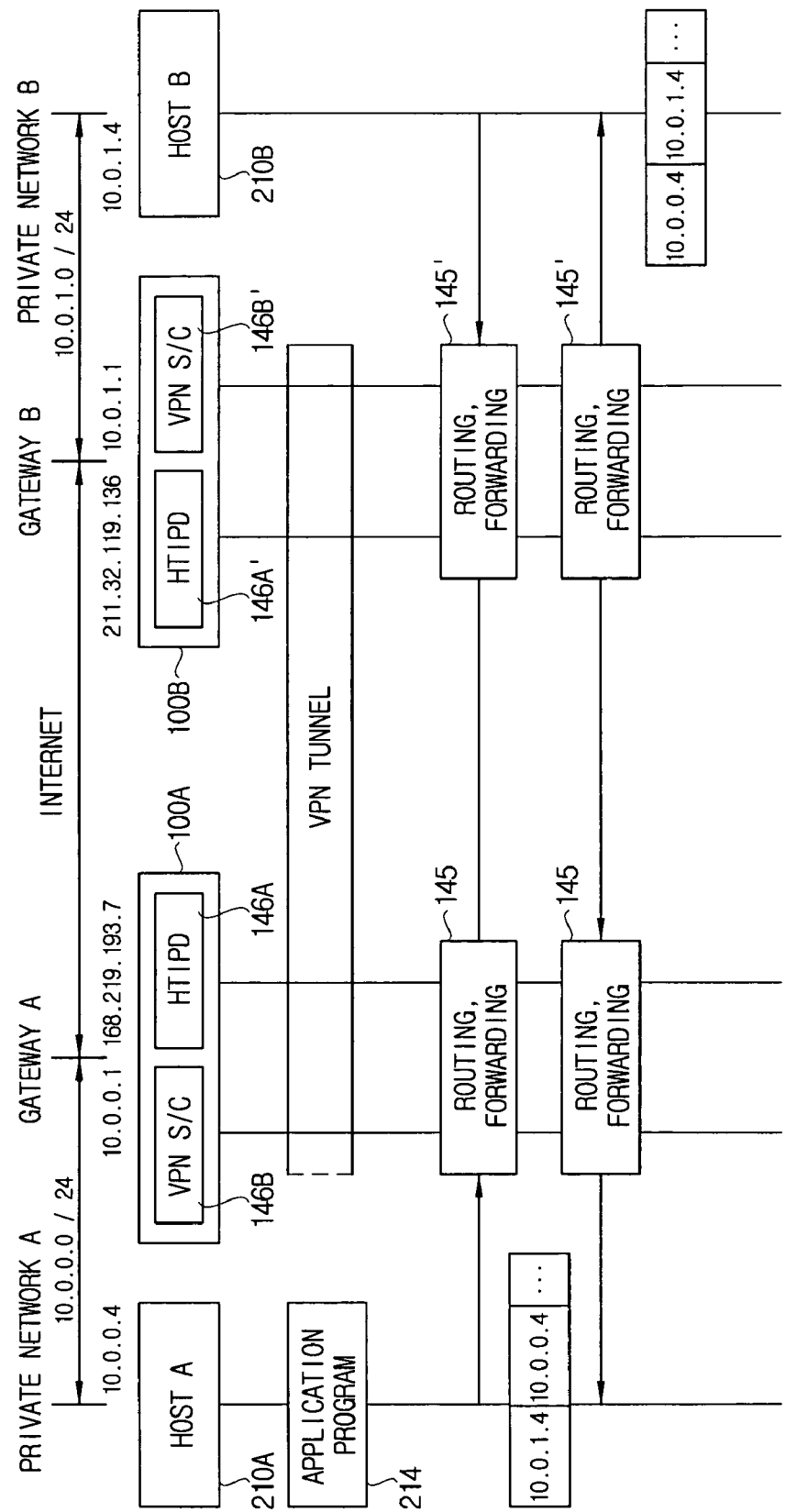
FIG. 10 is a signal flow view for explaining a packet transfer process between host A and host B through the tunnel set up therebetween by the process shown in FIG. 9.

FIG. 10 shows the signal flow in the process of packet transfer between the host A (210A) and the host B (210B) through a tunnel formed between the private network A (200A) and the private network B (200B). First, a user of the private network A (200A) knows the domain name of the host B (210B), and an application program installed in the host A (210A) sends out a DNS inquiry to the gateway A (100A) to find out the IP address that corresponds to the domain name of the host B (210B). Accordingly, the DSN processor 143 of the gateway A (100A) inspects the private network connection management table 132. If there is a VPN tunnel set up between the private network A (200A) and the private network B (200B), the gateway A (100A) sends out a DSN inquiry about the host B (210B) to the gateway B (100B).

When the DSN inquiry is transmitted from the gateway A (100A) to the gateway B (100B), the DSN processor 143' of the gateway B (100B) sends out a response message to the gateway A (100A) with reference to the private network connection management table 132'. The response message contains the network address 10.0.1.5 which indicates the host B (210B) in the VPN tunnel instead of the network address of the host B (210B). Process of sending out DSN inquiry and responding to the inquiry is omitted in drawings for the conciseness.

The gateway A (100A) forwards the private IP address 10.0.1.5, which is a response from the DNS processor 143' of the gateway B (100B) to the host B (210B), to the host A (210A). When the private IP address of the host B (210B) is received from the gateway A (100A), the host A (210A) writes the received private IP address 10.0.1.5 in the destination address, while writing a private IP address 10.0.0.4 of the host A (210A) in the source address. Accordingly, the host A (210A) transmits packets to the gateway A (100A).

When the packet is received from the host A (210A), the gateway A (100A) transfers the received packet to the end of the VPN formed between the gateway A 100A and the gateway B (100B) with reference to the routing table 145 and forwarding settings, and the packet sent to the end of the tunnel of the gateway A (100A) is transferred to the end of the tunnel of the gateway B (100B).

When the packet is transferred through the VPN tunnel, the gateway B (100B) forwards the packet to the host B (210B) with reference to the routing table 145' and forwarding settings.

When the packet is received, the host B (210B) processes the received packet, and sends out a response, with writing private IP address 10.0.1.5 of the host B (210B) in the destination address and writing private IP address 10.0.0.4 in the host A (210A) in the destination address.

The host A (210A) and the host B (210B) continuously repeat the above-mentioned packet transferring process between the private network A (200A) and the private network B (200B).

Figure 11:
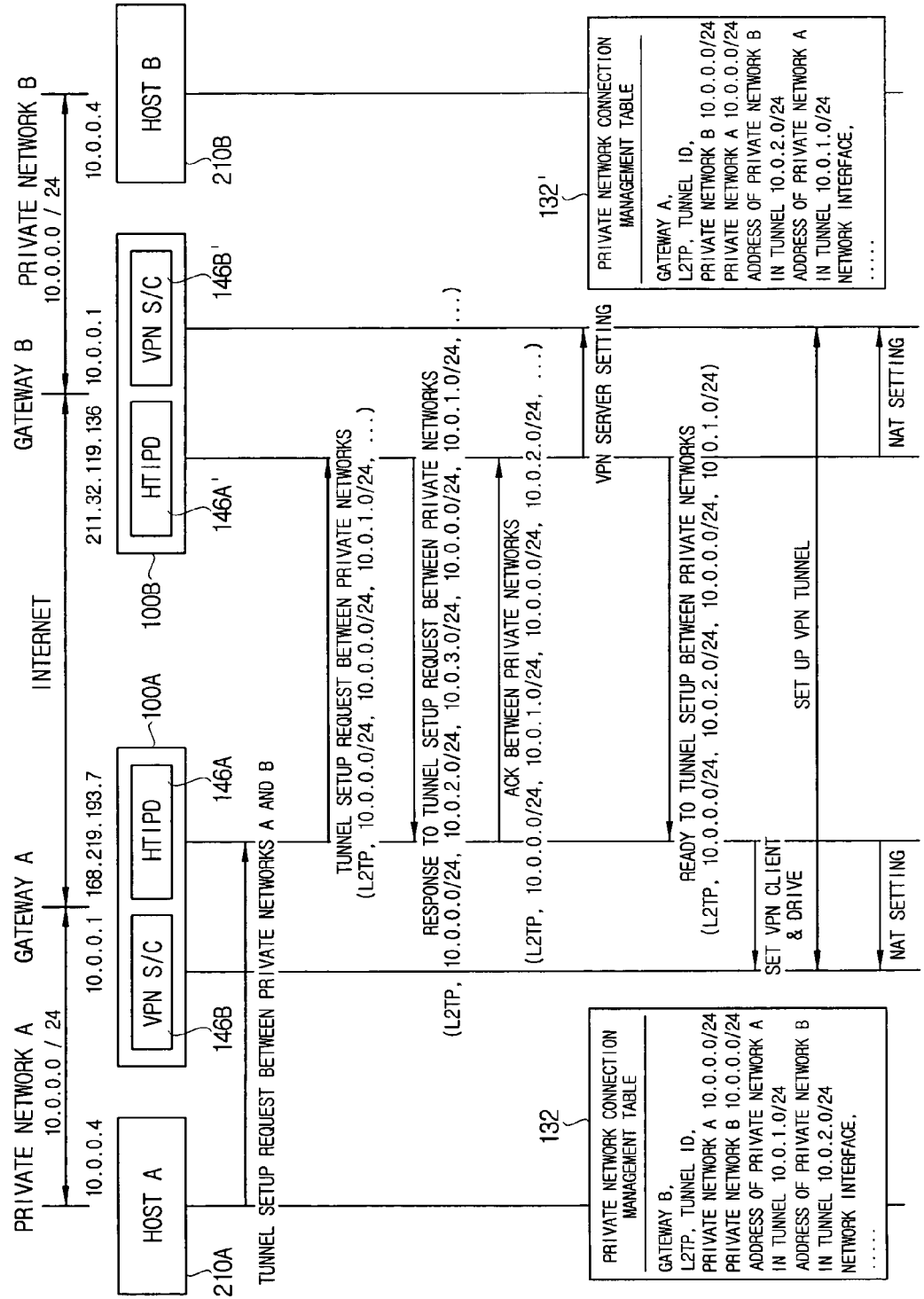
FIG. 11 is a signal flow view for explaining a VPN tunnel setup process between two private networks with expanded network IDs matching with each other.

FIG. 11 shows a signal flow, which explains the process of forming a VPN tunnel between two private networks with identical expanded network IDs.

First, the user of the private network A (200A) sends out a tunnel setup request page, which is provided by the web server 147 of the gateway A (100A), from the host A (210A) through a web browser 212, thereby requesting to create a tunnel between the private network A (200A) and the private network B (200B). In response to the request to form a tunnel between the private network A (200A) and the private network B (200B), the gateway A (100A) obtains through the DNS processor 143 a public IP address 211.32.119.136 of the gateway B (100B) from the DNS server 330 which is located in the Internet. The process of sending out DNS inquiry and responding to the inquiry is omitted in the drawings for the conciseness.

When the gateway A (100A) obtains the public IP address of the gateway B (100B), the gateway A (100A) drives the HTIP program at the HTIP processor 146A and requests the HTIP processor 146A' of the gateway B (100B) to create a tunnel between the private networks. The tunnel setup request between private networks may include a VPN protocol to be used such as L2TP, a network address 10.0.0.0/24 of the private network A (200A), and network addresses (10.0.0.0/24, 10.0.1.0/24, 10.0.2.0/24, . . . ) to be used in the VPN tunnel instead of the network address of the private network A (200A).

When the HTIP processor 146A' of the gateway B (100B) receives a tunnel setup request from the gateway A (100A), the gateway B (100B) transmits a response message to the tunnel setup request to the gateway A (100A). The response message may include a VPN protocol to be used such as L2TP, a network address 10.0.0.0/24 of the private network B (200B), network addresses (10.0.2.0/24, 10.0.3.0/24, 10.0.4.0/24, . . . ) to be used in VPN tunnel instead of the network address of the private network B (200B), a network address 10.0.0.0/24 of the private network A (200A), and a network address 10.0.1.0/24 to be used in VPN tunnel instead of the network address of the private network A (200A).

When the gateway A (100A) receives a response message from the gateway B (100B), the gateway A (100A) sends out an ACK message to the gateway B (100B). The ACK message may include a VPN protocol to be used such as L2TP, a network address 10.0.0.0/24 of the private network A (200A), a network address 10.0.0.0/24 of the private network B (200B), a network address 10.0.1.0/24 to be used in VPN tunnel instead of the network address of the private network A (100A), and a network address 10.0.2.0/24 to be used in VPN tunnel instead of the network address of the private network B (200B). Because the network address to be used in VPN tunnel instead of the network address of the private network A (200A) is different, the gateway A (100A) recognizes that address conversion will be taken place under NAT protocol at both ends of the VPN tunnel.

After the exchange of ACK message, private network connection management tables 132 and 132' are created at the gateway A (100A) and the gateway B (100B), respectively. Each private network connection management table 132 and 132' may include a VPN protocol in use such as L2TP, a tunnel ID between private networks, a domain name of counterpart gateway 100A and 100B, an item indicating whether the counterpart gateway 100A and 100B is a VPN server or a client, a network address of the private network A (200A), a network address of the private network B (200B), a network address to be used in VPN tunnel instead of network address of the private network A (200A), and a network address to be used in VPN tunnel instead of the network address of the private network B (200B).

The table generated by the gateway A (100A) may include a VPN protocol in use such as L2TP, a domain name of the gateway B (100B) such as 'gateway B', an item (a server) indicating that the gateway B is a VPN server, a network address 10.0.0.0/24 of the private network A (200A), a network address 10.0.0.0/24 of the private network B (200B), a network address 10.0.1.0/24 to be used in VPN tunnel instead of network address of the private network A (200A), and a network address 10.0.2.0/24 to be used in VPN tunnel instead of network address of the private network B (200B).

When the gateway B (100B) receives an ACK message, the gateway B (100B) sets the VPN processor 146B' to be a VPN server to create a VPN tunnel under the VPN protocol in use. When the preparation for the tunnel creation between private networks including the setting of the VPN processor 146B' to VPN server is completed, the HTIP processor 146A' of the gateway B (100B) sends out to the gateway A (100A) a READY message, notifying that a preparation of tunnel creation between the private networks has been completed. The READY message may include a VPN protocol in use such as L2TP, a network address 10.0.0.0/24 of the private network A (200A), a network address 10.0.0.0/24 of the private network B (200B), a network address 10.0.1.0/24 to be used in VPN tunnel for the private network A (200A), and a network address 10.0.2.0/24 to be used in VPN tunnel for the private network B (200B).

When the gateway A (100A) receives the READY message, the gateway A (100A) sets the VPN processor 146B to be a VPN client of the gateway B (100B) under the VPN protocol to be used. When the HTIP processor 146A' drives the VPN client, a VPN (L2TP) tunnel is created between the gateway A (100A) and the gateway B (100B).

According to the processes described above, a VPN tunnel is created between the gateway A (100A) and the gateway B (100B), and the packet, which is transferred to the end of VPN tunnel of the gateway A (100A), is transferred to the end of VPN tunnel of the gateway B (100B).

When the creation and linking of the VPN tunnel is completed, and after the PPP connection, the gateway A (100A) sets a NAT at the VPN tunnel toward the gateway A (100A), with reference to the private network connection management table 132. As the NAT is set, when the packet is transferred from the private network A (200A) through the gateway A (100A) to the VPN tunnel, the source address 10.0.0.x is translated to 10.0.1.x. When the packet is transferred from the VPN tunnel through the gateway A (100A) to the private network A, the destination address 10.0.1.y is translated to 10.0.0.y. The gateway B also sets a NAT at the VPN tunnel toward the gateway B (100B).

Figure 12:
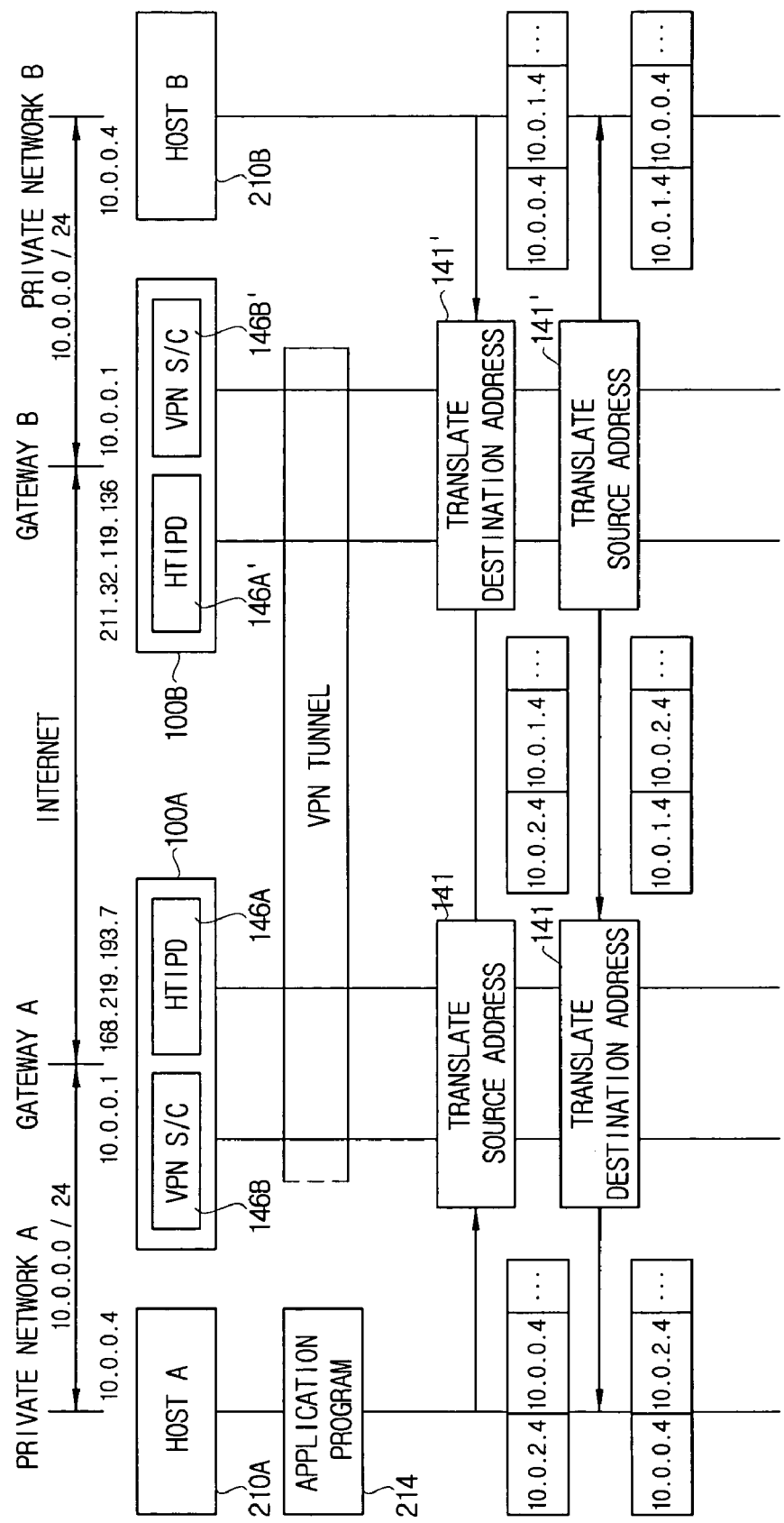
FIG. 12 is a signal flow view for explaining a packet transfer process between host A and host B through a the tunnel set up therebetween by the process shown in FIG. 11.

FIG. 12 shows a signal flow, which explains a packet transfer process between the host A (210A) and the host B (210B) through a tunnel set up between the private network A and the private network B by the processes shown in FIG. 11.

First, the user of the private network A 200A knows the domain name of the host B (210B). When the application program 214 installed in the host A (210A) sends out a DNS inquiry to the gateway A (100A), inquiring about the IP address which corresponds to the domain name of the host B (210B), the DNS processor 143 of the gateway A (100A) inspects the private network connection management table 132. If there is a VPN tunnel set up between the private network A (200A) and the private network B (200B), as it is recognized that a NAT is required for the packets passing through the tunnel, a DNS inquiry is sent out to the gateway B (100B) for a private IP address to be used in the VPN tunnel of the host B (210B).

When the DSN processor 143' of the gateway B (100B) receives the inquiry about the host B (210B), the DSN processor 143' sends out an IP address 10.0.2.5 to be used in VPN tunnel of the host B (210B) as a response message to the gateway A (100A), and the gateway A (100A) re-sends the response message to the host A (210A). The process of sending out DNS inquiry and responding to the inquiry are omitted in the drawings for the conciseness. After that, the host A (210A) transfers a packet to the gateway A (100A), to send the packet to the host B (210B). The address 10.0.2.5 is written as the destination address of the packet, and address 10.0.0.4 is written as the source address.

When the gateway A (100A) receives a packet from the host A (210A) which is destined to the host B (210B), the gateway A (100A) transfers the packet to the end of the tunnel of the gateway A (100A), with reference to the routing table and forwarding settings. Because NAT is set in the end of the VPN tunnel of the gateway A (100A), the source address 10.0.0.4 is translated to 10.0.1.4, and the packet with translated source address is transferred to the end of the tunnel of the gateway B (100B).

When the source address is translated through the NAT, and therefore, the packet with translated source address is transferred to the end of the gateway B (100B), the gateway B (100B) translates a destination address 10.0.2.5 to 10.0.0.5 through the NAT set in the end of the VPN tunnel. After the destination address is translated through the NAT, the packet with translated destination address is transferred to the host B (210B) with reference to the routing table and forwarding settings.

The host B (210B) sends out a response to the host A (210A), and accordingly, communications are performed as the packet transfer process is repeated.

FIG. 13 shows a signal flow, which explains the process of forming a VPN tunnel between two private networks A and B, in which the expanded network ID of the private network A is included in the expanded network ID of the private network B.

First, a user of the private network A (200A) reads out a tunnel setup request page, which is provided by the web server 147 of the gateway A (100A), at the host A (210A) through the web browser 212. Accordingly, in response to the user request for a tunnel creation, the gateway A (100A) obtains through the DNS processor 143 a public IP address 211.32.119.136 of the gateway B (100B) from the DNS server 330 which is located in the Internet. The process of sending out a DNS inquiry and responding to the inquiry are omitted in the drawings for the conciseness.

When the gateway A (100A) obtains the public IP address of the gateway B (100B), the HTIP processor 146A drives HTIP program, and the gateway B (100B) requests the HTIP processor 146A' of the gateway B (100B) to create a tunnel between the private networks. The tunnel setup request message may include a VPN protocol to be used such as L2TP, a network address 10.0.0.0/24 of the private network A (200A), and network addresses (10.0.0.0/24, 10.0.1.0/24, 10.0.2.0/24, . . . ) to be used in VPN tunnel instead of the network address of the private network A (200A).

The HTIP processor (146A') of the gateway B (100B) receives the tunnel setup request message from the gateway A (100A) and analyzes the received message. Because the network addresses (10.0.0.0/24, 10.0.1.0/24, . . . ), which are to be used in the VPN tunnel instead of the network address of the private network A (200A), are included in the network address of the private network B (200B), the HTIP processor 146A' of the gateway B (100B) sends out a NAK message to the gateway A (100A). The NAK message may include a part of tunnel setup request message from the gateway A (100A) to the gateway B (100B) for re-negotiation, such as network addresses to be used in VPN tunnel instead of network address of the private network A (200A), and a network address 10.0.0.0/16 of the private network B (200B).

When the HTIP processor 146A of the gateway A (100A) receives the NAK message from the gateway B (100B), the HTIP processor 146A analyzes the content of NAK message, and re-sends out a tunnel setup request. The second tunnel setup request message may include a VPN protocol to be used such as L2TP, a network address 10.0.0.0/24 of the private network A (200A), and network addresses (10.2.0.0/24, 10.2.1.0/24, . . . ) to be used in VPN tunnel instead of network address of the private network A (200A).

When the tunnel setup request message is received from the gateway A (100A), the HTIP processor 146A' of the gateway B (100B) analyzes the received request, and if determining it appropriate, sends out a response message to the request. The response message may include a VPN protocol to be used such as L2TP, a network address 10.0.0.0/16 of the private network B (200B), network addresses (10.1.0.0/16, 10.2.0.0/16, . . . ) to be used in VPN tunnel instead of the network address of the private network B (200B), a network address 10.0.0.0/24 of the private network A (200A), and a network address 10.2.0.0/24 to be used in VPN tunnel instead of network address of the private network A (200A).

When a response message is received from the gateway B (100B), the HTIP processor 146A of the gateway A (100A) analyzes the received message and if determining it appropriate, sends out an ACK message to the gateway B (100B). The ACK message may include a VPN protocol to be used such as L2TP, a network address 10.0.0.0/24 of the private network A (200A), a network address 10.2.0.0/24 to be used in VPN tunnel instead of the network address of the private network A (100A), a network address 10.0.0.0/16 of the private network B (200B), and a network address 10.1.0.0/16 to be used in VPN tunnel instead of the network address of the private network B (200B). Because the network address to be used in VPN tunnel instead of the network address of the private network A (200A) is different, it is recognized that the gateway A (100A) needs NAT.

After the sending out and receiving ACK message, private network connection management tables 132 and 132' are created at the gateway A (100A) and the gateway B (100B). The table generated by the gateway A (100A) may include a VPN protocol in use such as L2TP, an ID of tunnel between private networks, a domain name of the gateway B (100B), an item indicating that the gateway B (100B) is a VPN server, a network address 10.0.0.0/24 of the private network A (200A), and network address 10.0.0.0/16 of the private network B (200B), a network address 10.2.0.0/24 to be used in VPN tunnel instead of network address of the private network A (200A), and a network address 10.1.0.0/16 to be used in VPN tunnel instead of network address of the private network B (200B).

When the gateway B (100B) receives the ACK message, the gateway B (100B) sets the VPN processor 146B' to be a VPN server to create a VPN tunnel under the VPN protocol to be used. When the preparation for the tunnel setup between the private networks including setting of VPN processor 146B' as a VPN server is completed, the HTIP processor 146A' of the gateway B (100B) sends out a READY message to the gateway A (100A), and accordingly informs that the preparation for tunnel setup between the private networks has been completed. The READY message may include a VPN protocol in use such as L2TP, a network address 10.0.0.0/24 of the private network A (200A), a network address 10.0.0.0/16 of the private network B (200B), a network address 10.2.0.0/24 to be used in VPN tunnel for the private network A (200A), and a network address 10.1.0.0/16 to be used in VPN tunnel for the private network B (200B).

As the READY message is received, the HTIP processor 146A of the gateway A (100A) sets the VPN processor 146B to be a VPN client of the gateway B (100B) under the VPN protocol to be used. When the HTIP processor 146A drives the VPN client, a VPN (L2TP) tunnel is created between the gateway A (100A) and the gateway B (100B).

As described above, a VPN tunnel is created between the gateway A (100A) and the gateway B (100B). The packet, which is transferred to the end of the VPN tunnel of the gateway A (100A), is transferred to the end of the VPN tunnel of the gateway B (100B).

When the VPN tunnel is created and connected, the HTIP processor 146A of the gateway A (100A) sets a NAT at the VPN tunnel toward the gateway A (100A), with reference to the private network connection management table 132. As the NAT is set, when a packet is transferred from the private network A (200A) through the gateway A (100A) to the VPN tunnel, the source address 10.0.0.x is translated to 10.2.0.x. When a packet is transferred through the VPN tunnel and the gateway A (100A) to the private network A (200A), the destination address 10.2.0.y is translated to 10.0.0.y. The HTIP processor 146A' of the gateway B (100B) likewise sets a NAT at the VPN tunnel toward the gateway B (100B).

Because NAT is set at both ends of the VPN tunnel between the gateway A (100A) and the gateway B (100B), the host A (210A) and the host B (210B) can perform mutual communications through the transfer of the packets as shown in FIG. 12.

With the gateway as described with reference to one embodiment of the present invention, the coverage of user utilization on networks is greatly extended because it enables connection between private network and public network, or between private network and private network. As a result, user convenience increases, and a user of home network can more actively communicate with users of other home networks through a variety of communities. Additionally, information or devices are shared among the home networks more actively. Furthermore, shortage of public IP addresses under the current Internet Protocol version 4 (IPv4) environment can be solved, and as a result, the overall performance of networks improves.

The method as described above with reference to the second embodiment of the present invention is called, 'Home-to-Home Tunnelling Initiation' protocol (HTIP). Under the HTIP, information required for the creation of VPN tunnel between the private networks can be exchanged and negotiated in advance, and therefore, requirements for pre-setting of the VPN tunnel setup can be minimized. Also, by using the negotiated information of the HTIP processor in the controlling of VPN processor and NAT/NAPT processor, existing VPN protocols such as PPTP or L2TP can be directly used without requiring any modification. Under the HTIP, negotiation is made in advance and therefore, network addresses of the newly-formed VPN tunnel do not collide with the network addresses of the existing VPN tunnel. As a result, setting up the crossing VPN tunnels among two or more private networks is enabled.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A gateway comprising:
   at least one public network interface connected to a public network;
   at least one private network interface connected to a private network; and
   a control unit linked to the public network interface and the private network interface,
   wherein the control unit is configured to set up a virtual private network (VPN) tunnel by communicating with a gateway of a second private network connected to the public network, if a tunnel setup request is received from a host connected to a first private network to set up a tunnel to the second private network, and
   wherein the control unit is configured to create a new network address table in order for the first and said second private networks to use different network addresses in the VPN tunnel, and translate addresses based on the new network address table and forward data packets transmitted from the host connected to the first private network or from the second private network, if the first and second private networks have the same network address or a network address of one of the first and second private networks is included in a network address of the other one of the first and seconds private networks, wherein the communicating with a gateway comprises sending a tunnel setup request message comprising a network address of the first private network and a second network address to be used in the VPN tunnel as a network address of the first private network.

2. The gateway as claimed in claim 1, wherein the control unit comprises:
   a web or middleware server configured to provide a tunnel setup request page in order for the host connected to the first private network to initiate the tunnel setup request;
   a private network Domain Name Server (DNS) processor configured to obtain an Internet Protocol (IP) address of the gateway of the second private network from a Domain Name Server (DNS) connected to said public network with respect to the tunnel setup request by the host connected to the first private network;
   a VPN processor configured to operate as a server or a client according to the tunnel setup request transferred through the public network interface or the private network interface, and create a tunnel to said second private network; and
   a Network Address Table (NAT)/Network Address Port Table (NAPT) processor configured to translate a private IP address into an IP address or translating an IP address into a private IP address by using a NAPT protocol with respect to data packets transmitted between said public network and said private network, and translate private IP addresses in the VPN tunnel by using a NAT protocol if the VPN tunnel is set up between the first private network and the second private network.

3. The gateway as claimed in claim 2, wherein the VPN processor is configured to send a tunnel setup request message to the gateway of the second private network if the tunnel setup request is transmitted from the host connected to the first private network, and send an acknowledgement (ACK) to the gateway of the second private network if a response to the tunnel setup request is received from the gateway of the second private network.

4. The gateway as claimed in claim 3, wherein the response to the tunnel setup request message comprises a network address of the second private network and a second network address to be used for the network address of the second private network in the VPN tunnel.

5. The gateway as claimed in claim 3, wherein the response to the tunnel set up request message comprises a network address of the second private network and a second network address to be used in the VPN tunnel as a network address of the second private network is received, and the acknowledgement message comprises a network address of the first private network, the second network address, and a third network address to be used in the VPN tunnel as a network address of the second private network.

6. The gateway as claimed in claim 1, wherein the control unit comprises:

a web or middleware server configured to provide a tunnel setup request page in order for a host connected to the first private network to request the setup of the tunnel;

a private network Domain Name Server (DNS) processor configured to obtain an Internet Protocol (IP) address of the gateway of the second private network from a Domain Name Server (DNS) connected to the public network with respect to the tunnel setup request by the host connected to the first private network;

a Home-to-Home Tunnelling Initiation Protocol (HTIP) processor configured to transmit and receive the tunnel setup request message in accordance with the tunnel setup request being transmitted through the public network interface or the private network interface;

a Virtual Private Network (VPN) processor configured to operate as a server or a client, and perform processing such that the tunnel can be set up between the first and second private networks; and a Network Address Table (NAT)/Network Address Port Translation (NAPT) processor for translating a private IP address into an IP address or translating an IP address into a private IP address by using a NAPT protocol with respect to data packets transmitted to between the public network and the private network, and translate private IP addresses in the VPN tunnel by using a NAT protocol if the VPN tunnel is set up between the first private network and the second private network and if address translation is required.

7. The gateway as claimed in claim 6, wherein the HTIP processor is configured to send the tunnel setup request message to the gateway of the second private network if the tunnel setup request to the second private network is received from the host connected to the first private network, and send an acknowledgement (ACK) message to the gateway of the second private network if a response to the tunnel setup request is received from the gateway of the second private network.

8. The gateway as claimed in claim 7, wherein the tunnel setup request message further comprises:

a VPN protocol to be used in setting up the tunnel.

9. The gateway as claimed in claim 7, wherein the HTIP processor is configured to send a response message if the tunnel setup request message is received from the second private network, the tunnel setup request message further comprises a VPN protocol to be used in setting up the tunnel, and the response message comprises a VPN protocol to be used in setting up the tunnel, a network address of the first private network, third network addresses to be used in the VPN tunnel for a network address of the first private network, a network address of the second private network, and the second network addresses.

10. The gateway as claimed in claim 7, wherein the HTIP processor is configured to set the VPN processor as a VPN server, and send out a READY message, notifying the second private network that the setting of the VPN processor is completed, if the ACK message is received from the second private network.

11. The gateway as claimed in claim 10, wherein the HTIP processor is configured to set the VPN processor as a VPN client with respect to the VPN server of the second private network, and drive the VPN client to set up a VPN tunnel between the first private network and the second private network, if the READY message is received from the second private network.

12. The gateway as claimed in claim 7, wherein the HTIP processor is configured to analyze the tunnel setup request message or the response message from the second private network, and notify the second private network the tunnel request message or the response message is inappropriate by sending out a NAK message to the second private network.

13. The gateway as claimed in claim 12, wherein the HTIP processor is configured to newly set parameters and parameter values contained in the tunnel setup request message or the respond message and re-send the newly-set parameters and parameter values to the second private network, if the NAK message is received in response to the tunnel setup request message or the response message being transmitted to the second private network.

14. The gateway as claimed in claim 7, wherein the HTIP processor is configured to negotiate in advance parameters comprising a VPN protocol to be used in setting up the tunnel, a network address of the first private network, a second network address to be used in the VPN tunnel for a network address of the first private network, a network address of the second private network, a third network address to be used in the VPN tunnel for a network address of the second private network, such that VPN tunnels are set up simultaneously in the private network while the network addresses used in existing VPN tunnels do not collide with the network addresses of the VPN tunnel.

* * * * *